(12) United States Patent
Lim et al.

(10) Patent No.: US 8,988,642 B2
(45) Date of Patent: Mar. 24, 2015

(54) LIQUID CRYSTAL DISPLAY DEVICES AND METHODS OF MANUFACTURING LIQUID CRYSTAL DISPLAY DEVICES

(75) Inventors: Jae-Ik Lim, Yongin (KR); Jae-Hyun Kim, Yongin (KR); Jong-in Baek, Yongin (KR); Yong-Seok Yeo, Yongin (KR); Gee-Bum Kim, Yongin (KR); Won-Sang Park, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 613 days.

(21) Appl. No.: 13/278,175

(22) Filed: Oct. 20, 2011

(65) Prior Publication Data

US 2012/0113363 A1 May 10, 2012

(30) Foreign Application Priority Data

Nov. 9, 2010 (KR) .................. 10-2010-0110910
Jun. 29, 2011 (KR) .................. 10-2011-0063557

(51) Int. Cl.
*G02F 1/1343* (2006.01)
*G02F 1/1334* (2006.01)
*G02F 1/1335* (2006.01)

(52) U.S. Cl.
CPC ........ *G02F 1/1334* (2013.01); *G02F 1/133514* (2013.01); *G02F 1/133553* (2013.01); *G02F 1/134309* (2013.01)
USPC ............................ 349/141; 349/145; 349/146

(58) Field of Classification Search
USPC .......................................... 349/141, 145, 146
See application file for complete search history.

(56) References Cited

U.S. PATENT DOCUMENTS

| | | | | |
|---|---|---|---|---|
| 4,579,423 A | * | 4/1986 | Fergason | 349/86 |
| 5,018,840 A | * | 5/1991 | Ogawa | 349/89 |
| 5,784,136 A | | 7/1998 | Ando et al. | |
| 6,005,650 A | * | 12/1999 | Kim et al. | 349/130 |
| 6,310,672 B1 | * | 10/2001 | Koike et al. | 349/106 |
| 6,828,006 B2 | * | 12/2004 | Takada et al. | 428/143 |
| 7,446,835 B2 | * | 11/2008 | Ukawa | 349/114 |
| 2004/0012738 A1 | * | 1/2004 | Murai et al. | 349/114 |
| 2004/0095542 A1 | * | 5/2004 | Shim et al. | 349/141 |

FOREIGN PATENT DOCUMENTS

| | | |
|---|---|---|
| JP | 05-080305 | 4/1993 |
| JP | 05-281531 | 10/1993 |
| JP | 2000-147479 | 5/2000 |
| JP | 2004-163818 | 6/2004 |
| KR | 1019990029886 A | 4/1999 |
| KR | 1020080037487 A | 4/2008 |
| KR | 1020090111161 A | 10/2009 |

* cited by examiner

*Primary Examiner* — Lucy Chien
(74) *Attorney, Agent, or Firm* — Christie, Parker & Hale, LLP

(57) ABSTRACT

A liquid crystal display device includes: a first substrate; a first electrode on a first face of the first substrate; a second substrate opposed to the first substrate; a second electrode on a first face of the second substrate, the second electrode corresponding to the first electrode; and a liquid crystal structure between the first substrate and the second substrate, the liquid crystal structure including liquid crystal capsules.

41 Claims, 15 Drawing Sheets

500

LIQUID CRYSTAL DISPLAY DEVICES AND METHODS OF MANUFACTURING LIQUID CRYSTAL DISPLAY DEVICES

CROSS-REFERENCE TO RELATED APPLICATION

This application claims priorities to and the benefits of Korean Patent Application No. 2010-0110910, filed on Nov. 9, 2010 and Korean Patent Application No. 2011-0063557, filed on Jun. 29, 2011 in the Korean Intellectual Property Office (KIPO), the entire contents of which are herein incorporated by references.

BACKGROUND

1. Field

Embodiments of the present invention relate to liquid crystal display devices and methods of manufacturing liquid crystal display devices.

2. Description of Related Art

A liquid crystal display (LCD) device generally includes two transparent substrates and a liquid crystal layer disposed between the two substrates. The liquid crystal display device displays images utilizing different light transmittances of each pixel, which may be caused by the movement of liquid crystal molecules in the liquid crystal layer of the liquid crystal display device. The liquid crystal molecules between the two substrates may be arranged initially in a direction substantially perpendicular to the substrates (i.e., vertical alignment), or along a direction substantially parallel to the substrates (i.e., parallel or horizontal alignment). When an electric field is generated in each pixel by applying voltages to transparent electrodes formed on the substrates, orientation of the liquid crystal molecules may be changed to display the images. When the electric field is not generated in each pixel, the liquid crystal molecules may be returned (or recovered) to an initial orientation thereof.

When a user touches or presses one of the substrates of the liquid crystal display device, the liquid crystal molecules may be locally orientated along a direction in which the user presses the substrate even though the electric field is not generated between the substrates, thereby causing a blemish, dark mark, spot or stain of the liquid crystal display device. Thus, the liquid crystal molecules may not be rapidly returned to (or recovered toward) their initial orientation, or adjacent liquid crystal molecules may be continuously slanted (or slashed) along the pressurized direction, which is called a bruising effect and/or pooling effect. In consideration of those problems, a supporting frame or a spacer may be disposed between the substrates (e.g., at a set or predetermined distance), however, a construction of the liquid crystal display device having the supporting frame or the spacer may be complicated and also processes of manufacturing the liquid crystal display device may be complicated.

SUMMARY

Aspects of embodiments of the present invention are directed toward liquid crystal display devices having improved image quality and wide viewing angles (or view angles) while reducing or preventing a bruising effect and/or pooling effect.

Aspects of embodiments of the present invention are directed toward methods of manufacturing liquid crystal display devices having improved image quality and wide viewing angles (or view angles) while reducing or preventing a bruising effect and/or pooling effect.

Aspects of embodiments of the present invention are directed toward liquid crystal display devices having red, green and blue liquid crystal structures displaying color images without a color filter or a retardation film.

Aspects of embodiments of the present invention are directed toward methods of manufacturing liquid crystal display devices including red, green and blue liquid crystal structures displaying color images without a color filter or a retardation film.

Embodiments of the present invention relate to liquid crystal display devices including minute liquid crystal capsules and methods of manufacturing the liquid crystal display devices.

According to example embodiments, there is provided a liquid crystal display device including a first substrate; a first electrode on a first face of the first substrate; a second substrate opposed to the first substrate; a second electrode on a first face of the second substrate, the second electrode corresponding to the first electrode; and a liquid crystal structure between the first substrate and the second substrate, the liquid crystal structure including liquid crystal capsules.

Each of the liquid crystal capsules may include liquid crystal molecules and a polymer layer enclosing the liquid crystal molecules.

The liquid crystal display device may have a first region, a second region and a third region. The liquid crystal structure may include a red liquid crystal structure in the first region, a green liquid crystal structure in the second region, and a blue liquid crystal structure in the third region.

The red, the green and the blue liquid crystal structures may include a red pigment structure, a green pigment structure and a blue pigment structure, respectively. The red, the green and the blue pigment structures may respectively include a red pigment, a green pigment and a blue pigment mixed with binders, surface-active agents and/or additives.

The red, the green and the blue liquid crystal structures may include red, green and blue pigment coating layers surrounding the liquid crystal capsules, respectively. The red, the green and the blue pigment coating layers may respectively include red, green and blue pigments mixed with binders, surface-active agents and/or additives.

The red, the green and the blue liquid crystal structures may include red, green and blue color binders in which the liquid crystal capsules are dispersed, respectively.

The liquid crystal display device may further include barrier ribs among the red, the green and the blue liquid crystal structures.

Each of the liquid crystal molecules may have a positive dielectric anisotropy or a negative dielectric anisotropy. Each of the liquid crystal capsules may have a diameter of about 10 nm to about 380 nm.

The liquid crystal display device may further include at least one polarization plate on at least one of a second face of the first substrate and a second face of the second substrate.

At least one of the first electrode and the second electrode may be aligned relative to an optical axis of the at least one polarization plate at an angle of about 45 degrees.

At least one of the first electrode and the second electrode may have a substantially embossed "I" shape, a substantially engraved "I" shape, a substantially embossed "T" shape, a substantially engraved "T" shape, a substantially separated embossed "T" shape or a substantially separated engraved "T" shape.

The liquid crystal display device may further include a first polarization plate on a second face of the first substrate, and a second polarization plate on a second face of the second substrate.

At least one of the first electrode or the second electrode may be aligned relative to at least one of an optical axis of the first polarization plate or an optical axis of the second polarization plate at an angle of about 45 degrees.

According to another embodiment of the present invention, a liquid crystal display device includes: a first substrate; a first electrode on a first face of the first substrate; a second substrate opposed to the first substrate; a reflection layer on a first face of the second substrate, the reflection layer corresponding to the first electrode; and a liquid crystal structure between the first substrate and the second substrate, the liquid crystal structure comprising liquid crystal capsules.

The reflection layer may include at least one material selected from the group consisting of aluminum (Al), chrome (Cr), molybdenum (Mo), platinum (Pt), and combinations thereof.

The reflection layer may include a plurality of concave portions and a plurality of convex portions.

The liquid crystal display device may further include a polarization plate on a second face of the first substrate.

The first electrode may be aligned relative to an optical axis of the polarization plate at an angle of about 45 degrees.

The liquid crystal display device may include a reflective region and a transmissive region, the reflection layer may be in the reflective region, and the liquid crystal display device may further include a second electrode on the first face of the second substrate in the transmissive region.

Each of the liquid crystal capsules may include liquid crystal molecules and a polymer layer enclosing the liquid crystal molecules.

The liquid crystal display device may have a first region to a third region. Further, the liquid crystal structure may include a red liquid crystal structure in the first region, a green liquid crystal structure in the second region and a blue liquid crystal structure in the third region.

The red, the green and the blue liquid crystal structures may include red, green and blue pigment structures, respectively. The red, the green and the blue liquid crystal structures may include red, green and blue pigment coating layers enclosing the liquid crystal capsules, respectively.

The red, the green and the blue liquid crystal structures may include red, green and blue color binders in which the liquid crystal capsules are dispersed, respectively.

The liquid crystal display device may further include barrier ribs among the red, green and blue liquid crystal structures.

According to another embodiment of the present invention, a method of manufacturing a liquid crystal display device includes: forming a first electrode on a first face of a first substrate; forming a polarization plate on a second face of the first substrate; forming a second electrode on a first face of a second substrate opposed to the first face of the first substrate; and forming a liquid crystal structure between the first substrate and the second substrate, the liquid crystal structure including liquid crystal capsules having liquid crystal molecules.

The forming of the first electrode may include: forming a conductive layer on the first face of the first substrate; and patterning the conductive layer to form the first electrode aligned relative to an optical axis of the polarization plate at an angle of about 45 degrees.

The liquid crystal molecules may be formed using a high pressure homogenizer.

The forming of the liquid crystal structure may include spreading the liquid crystal capsules on the first electrode or on the second electrode.

The forming of the liquid crystal structure may include printing the liquid crystal capsules on the first electrode or on the second electrode.

The method of manufacturing a liquid crystal display device may further include combining the first substrate with the second substrate before forming the liquid crystal structure or after forming the liquid crystal structure.

According to another embodiment of the present invention, a method of manufacturing a liquid crystal display device includes: forming a first electrode on a first substrate, the first substrate including a first region, a second region and a third region; forming a blue liquid crystal structure in the third region of the first substrate; forming a green liquid crystal structure in the second region of the first substrate; forming a blue liquid crystal structure in the first region of the first substrate; forming a second electrode on a second substrate; and combining the first substrate with the second substrate by interposing the blue, the green and the red liquid crystal structures between the first and the second substrates.

The method of manufacturing a liquid crystal display device may further include forming barrier ribs among the first region, the second region and the third region.

The forming of the blue liquid crystal structure may include: spreading a blue mixture including a blue pigment structure and liquid crystal capsules on the first electrode in the third region; and forming the blue liquid crystal structure from the blue mixture. The forming of the green liquid crystal structure may include: spreading a green mixture including a green pigment structure and liquid crystal capsules on the first electrode in the second region; and forming the green liquid crystal structure from the green mixture. The forming of the red liquid crystal structure may include: spreading a red mixture including a red pigment structure and liquid crystal capsules on the first electrode in the first region; and forming the red liquid crystal structure from the red mixture.

The forming of the blue liquid crystal structure may include: forming a preliminary blue liquid crystal structure including a blue pigment structure and liquid crystal capsules on the first electrode; and removing portions of the preliminary blue liquid crystal structure in the first and the second regions.

The forming of the green liquid crystal structure may include: forming a preliminary green liquid crystal structure including a green pigment structure and liquid crystal capsules on the blue liquid crystal structure and the first electrode; and removing portions of the preliminary green liquid crystal structure from the first region and the blue liquid crystal structure.

The forming of the red liquid crystal structure may include: forming a preliminary red liquid crystal structure including a red pigment structure and liquid crystal capsules on the blue and green liquid crystal structures and the first electrode; and removing portions of the preliminary red liquid crystal structure from the blue and the green liquid crystal structures.

The removing of the portions of the preliminary blue, the preliminary green and the preliminary red liquid crystal structures may include an exposure process and a developing process.

According to example embodiments, the liquid crystal display device may include a liquid crystal structure having minute liquid crystal capsules, so that the liquid crystal display device may provide (or ensure) a wide viewing angle (e.g., a desired wide view angle) without any alignment layer or retardation layer. Further, when a user presses the first substrate and/or the second substrate, device liquid crystal molecules may be received in the minute liquid crystal capsules, such that the liquid crystal display device may effectively reduce or prevent several problems such as recovery delay of the liquid crystal molecules toward initial orientation; continuous slanting (or slashing) of adjacent liquid crystal molecules; generating dark marks, stains or spot; etc. According to example embodiments, the liquid crystal display device may include red, green and blue liquid crystal structures including blue, green and red pigment structures, pigment coating layers or color binders, so that the liquid crystal display device may display color images without a color filter or a retardation film. Therefore, the liquid crystal display device having a simple construction may be manufactured by simplified processes.

BRIEF DESCRIPTION OF THE DRAWINGS

Example embodiments will be more clearly understood from the following detailed description taken in conjunction with the accompanying drawings. FIGS. 1 to 14 represent non-limiting, example embodiments as described herein.

FIG. 1 is a cross-sectional view illustrating a transmissive type liquid crystal display device in accordance with example embodiments.

FIG. 6 is a cross-sectional view illustrating a reflective type liquid crystal display device in accordance with example embodiments.

FIG. 7 is a cross-sectional view illustrating a transflective type liquid crystal display device in accordance with example embodiments.

FIG. 8 is a flow chart illustrating a method of manufacturing a liquid crystal display device in accordance with example embodiments.

FIG. 9 is a flow chart illustrating a method of manufacturing a liquid crystal display device in accordance with example embodiments.

FIG. 10 is a cross-sectional view illustrating a liquid crystal display device in accordance with example embodiments.

FIG. 13 is a cross-sectional view illustrating a liquid crystal display device in accordance with example embodiments.

FIG. 14 is a cross-sectional view illustrating a liquid crystal display device in accordance with example embodiments.

DESCRIPTION OF EMBODIMENTS

Figure 1:
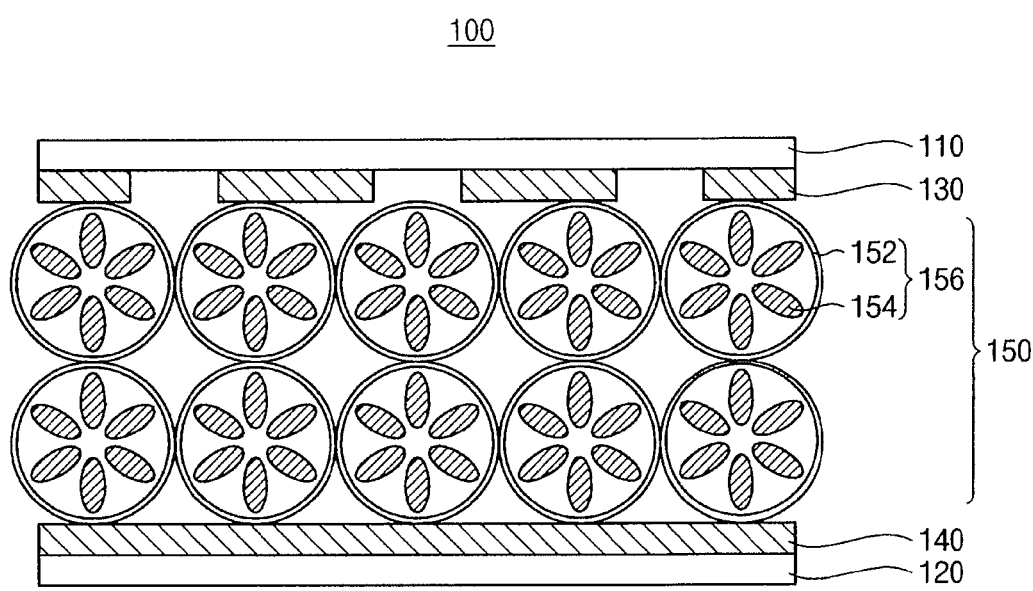

Various example embodiments will be described more fully hereinafter with reference to the accompanying drawings, in which some example embodiments are shown. The invention may, however, be embodied in many different forms and should not be construed as limited to the example embodiments set forth herein. Rather, these example embodiments are provided so that this description will be thorough and complete, and will fully convey the scope of the invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer, or one or more intervening elements or layers may be present therebetween. In contrast, when an element is referred to as being "directly on," "directly connected to" or "directly coupled to" another element or layer, there are no intervening elements or layers present therebetween. Like numerals refer to like elements throughout. As used herein, the term "and/or" includes any and all combinations of one or more of the associated listed items.

It will be understood that, although the terms first, second, third, fourth etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, elements described as "below" or "beneath" other elements or features would then be oriented "above" the other elements or features if the device in the figures is turned over. Thus, the exemplary term "below" can encompass an orientation of both above and below. The device may be otherwise oriented (e.g., rotated 90 degrees or at other orientations) and the spatially relative descriptors used herein interpreted accordingly.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, groups, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from an implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a cross-sectional view illustrating a transmissive type liquid crystal display device in accordance with example embodiments.

Referring to FIG. 1, a liquid crystal display device 100 may include a first substrate 110, a second substrate 120, a first electrode 130, a second electrode 140 and a liquid crystal structure 150.

The first substrate 110 may include a transparent insulation substrate such as a glass substrate, a transparent polymer substrate, a transparent ceramic substrate, a transparent metal oxide substrate, etc. Color filters (not illustrated) may be disposed on the first substrate 110. Light passing through the liquid crystal structure 150 may be filtered into colors of light by the color filters. The color filters may include a red color filter, a green color filter and a blue color filter, which may be used to obtain red (R) light, green (G) light and blue (B) light, respectively.

The second substrate 120 may substantially correspond to the first substrate 110. For example, the second substrate 120 may be substantially opposite to the first substrate 110. The second substrate 120 may include a transparent insulation substrate such as a glass substrate, a transparent polymer substrate, a transparent ceramic substrate, a transparent metal oxide substrate, etc. A plurality of pixel regions displaying images may be provided on the second substrate 120. Wirings such as gate lines and data lines, and switching devices such as thin film transistors (TFT) may be provided in the pixel regions of the second substrate 120.

In some example embodiments, at least one polarization plate may be disposed on at least one of the first substrate 110 and the second substrate 120. For example, one polarization plate may be positioned on a second face of the first substrate 110 substantially opposite to (i.e., facing oppositely away from) a first face thereof on which the first electrode 130 is located. Further, another polarization plate may be additionally disposed on a second face of the second substrate 120 substantially opposite to a first face thereof on which the second electrode 140 is positioned. Alternatively, a first polarization plate and/or a second polarization plate may be positioned on the first substrate 110 and the second substrate 120, respectively.

The first electrode 130 may be located on the first face of the first substrate 110. The first electrode 130 may include a transparent conductive material capable of transmitting light therethrough. For example, the first electrode 130 may include indium tin oxide (ITO), indium zinc oxide (IZO), zinc oxide (ZnOx), tin oxide (SnOx), fluorine-doped tin oxide (FTO), etc. These may be used alone or in a combination thereof. In example embodiments, the first electrode 130 may serve as a common electrode shared by the pixel regions of the liquid crystal display device.

The second electrode 140 may be positioned on the first face of the second substrate 120. In example embodiments, the second electrode 140 may serve as a pixel electrode provided in each pixel region of the second substrate 120 for receiving a data signal from the data line. The second electrode 140 may include a transparent conductive material for transmitting light therethrough. For example, the second electrode 140 may include ITO, IZO, zinc oxide, tin oxide, FTO, etc. These may be used alone or in a combination thereof.

The liquid crystal structure 150 may be positioned between the first electrode 130 of the first substrate 110 and the second electrode 140 of the second substrate 120. The liquid crystal structure 150 may include a plurality of liquid crystal capsules 156, each of which has a polymer layer 152 and liquid crystal molecules 154 received in the polymer layer 152. That is, the polymer layer 152 may enclose the liquid crystal molecules 154. The liquid crystal structure 150 may have a thickness of about several micrometers to dozens of micrometers. However, the thickness of the liquid crystal structure 150 may vary in accordance with sizes of the liquid crystal molecules 154 and/or sizes of liquid crystal capsules 156.

In example embodiments, the liquid crystal capsules 156 having minute sizes may be arranged in the liquid crystal structure 150 along a direction (e.g., a predetermined direction). Alternatively, the liquid crystal capsules 156 may be randomly disposed in the liquid crystal structure 150. When an electric field is not applied to the liquid crystal structure 150, the liquid crystal molecules 154 in the liquid crystal capsules 156 may be arranged into various suitable structures, such as a radial structure, a bipolar structure, a toroidal structure, a coaxial structure, etc. Alternatively, the liquid crystal molecules 154 may be randomly dispersed (or arranged) in the liquid crystal capsules 156.

In example embodiments, each of the liquid crystal capsules 156 may have a diameter smaller (e.g., substantially smaller) than a wavelength of visible light, so that the liquid crystal capsules 156 may transmit visible light therethrough. Additionally, the liquid crystal capsules 156 may have diameters larger (e.g., substantially larger) than diameters of the liquid crystal molecules 154. Furthermore, the liquid crystal capsules 156 may have diameters smaller (e.g., substantially smaller) than a minimum wavelength of visible light. Visible light may generally have a wavelength in a range of about 380 nm to about 770 nm, so that each liquid crystal capsule 156 may have a diameter that is less than the wavelength of visible light. For example, the liquid crystal capsules 156 may have diameters in a range of about 10 nm to about 380 nm (e.g., diameters at 10 nm or 380 nm or between 10 nm and 380 nm).

When the liquid crystal capsules 156 have diameters of below (e.g., substantially below) about 10 nm, the liquid crystal capsules 156 may not enclose sufficient liquid crystal molecules 154 therein. Thus, liquid crystal molecules 154 may not be properly arranged along a direction in which the electric field is applied between the first and the second electrodes 130 and 140. When the liquid crystal capsules 156 have diameters above (e.g., substantially above) about 380 nm, visible light having a wavelength of about 380 nm to 770 nm may be scattered at boundaries of the liquid crystal capsules 156, thereby requiring additional elements in order to avoid the scattering of the visible light. However, when the liquid crystal capsules 156 have diameters of about 10 nm to 380 nm, the wavelength of visible light may be larger (e.g., substantially larger) than the diameters of liquid crystal capsules 156, so that visible light may pass through the liquid crystal capsules 156 including liquid crystal molecules 154 without scattering of the visible light. Therefore, visible light may sufficiently pass through the liquid crystal structure 150, even though the liquid molecules 154 of the liquid crystal structure 150 are not oriented in only one direction (or a single direction).

In example embodiments, the liquid crystal molecules 154 may have a positive dielectric anisotropy. In this case, the brightest image may be displayed by the liquid crystal display device 100 when an electric field is not applied to the liquid crystal structure 150. That is, the liquid crystal display device 100 may be operated in a white mode. In some example embodiments, the liquid crystal molecules 154 may have a negative dielectric anisotropy. Here, the darkest image may be displayed by the liquid crystal display device 100 when an electric field is not applied to the liquid crystal structure 150. That is, the liquid crystal display device 100 may have a black mode.

According to example embodiments, the liquid crystal display device 100 may have the liquid crystal structure 150 including a plurality of liquid crystal capsules 156 having diameters of about 10 nm to 380 nm. Visible light may be transmitted through the liquid crystals molecules 154 so that an additional alignment layer may not be required to control the initial alignment of the liquid crystal molecules 154. Additionally, the movement of the liquid crystal molecules 154 may be confined in the polymer layer 152 such that a spacer or a supporting member may not be needed to uniformly place the liquid crystal molecules 154 at each pixel region. Furthermore, a pooling effect or a bruising effect caused by the displacement of the liquid crystal molecules 154 may be reduced or prevented when a user touches the first substrate 110 and/or the second substrate 120 to operate the liquid crystal display device 100.

FIGS. 2A to 2F are cross-sectional views illustrating various structures of first electrodes in liquid crystal display devices in accordance with example embodiments. In FIGS. 2A to 2F, the first electrodes may be formed to have structures substantially the same as or substantially similar to the first electrode 130 disposed on the first substrate 110 described with reference to FIG. 1.

Figure 2A:
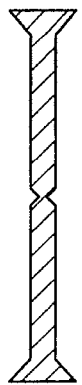
FIGS. 2A to 2F are cross-sectional views illustrating structures of first electrodes in liquid crystal display devices in accordance with example embodiments.
Figure 2B:
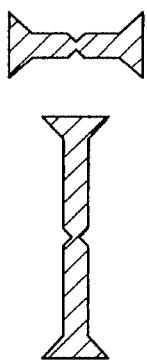
Figure 2C:
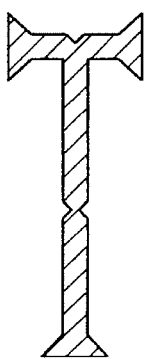
Figure 2D:
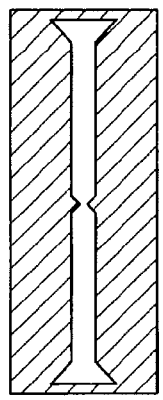
Figure 2E:
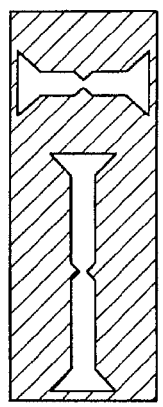
Figure 2F:
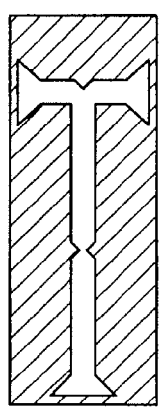

As illustrated in FIGS. 2A to 2F, the first electrodes disposed on a first substrate may be formed to have various suitable structures. For example, each of the first electrodes may have a substantially "I" shape as illustrated in FIGS. 2A and 2D, a substantially separated "T" shape as illustrated in FIGS. 2B and 2E, or a substantially "T" shape as illustrated in FIGS. 2C and 2F. Further, each of the first electrodes may have a positive (embossed) structure that may protrude directly from the first substrate as illustrated in FIGS. 2A to 2C, or a negative (engraved) structure that may partially expose the first substrate as illustrated in FIGS. 2D to 2F. In example embodiments, each of the first electrodes may have a substantially embossed "I" shape in FIG. 2A, a substantially separated and embossed "T" shape in FIG. 2B, a substantially embossed "T" shape in FIG. 2C, a substantially engraved "I" shape in FIG. 2D, a substantially separated and engraved "T" shape in FIG. 2E, a substantially engraved "T" shape in FIG. 2F, etc.

In example embodiments, when the first electrode 130 is arranged by an angle of about 45 degrees with respect to a direction of a transmission light axis or an absorption light axis of a polarization plate disposed on the first substrate 110 and/or the second substrate 120, the liquid crystal display device 100 may have the highest transmittance of light. In other words, when the first electrode 130 having the shape of the positive/negative (or embossed/engraved) "I" or "T" is aligned by an angle of about 45 degrees relative to the transmission light axis or the absorption light axis of the polarization plate, the liquid crystal display device 100 may have the highest optical efficiency. Additionally, when a voltage is applied to the first electrode 130 formed to have various suitable structures as illustrated in FIGS. 2A to 2F, a direction of an electric field generated between the first and the second electrodes 130 and 140 may not be uniform due to (or according to) the shape of the first electrode 130. The liquid crystal molecules 154 of the liquid crystal structure 150 may be arranged according to the nonuniformly generated electric field to thereby generate multiple domains (or multi domains) in the pixel regions of the liquid crystal display device 100. Therefore, the liquid crystal display device 100 may have relatively wide optical isotropy so that the liquid crystal display device 100 may ensure a wide viewing angle (e.g., a desired wide view angle).

In some example embodiments, the second electrode 140 on the second substrate 120 may be formed to have a structure substantially the same as or substantially similar to that of the first electrode described with reference to FIGS. 2A to 2F. That is, the second electrode 140 may also have a substantially embossed "I" shape as in FIG. 2A, a substantially separated and embossed 'T' shape as in FIG. 2B, a substantially embossed "T" shape as in FIG. 2C, a substantially engraved "I" shape as in FIG. 2D, a substantially separated and engraved "T" shape as in FIG. 2E, a substantially engraved "T" shape as in FIG. 2F, etc.

Figure 3A:
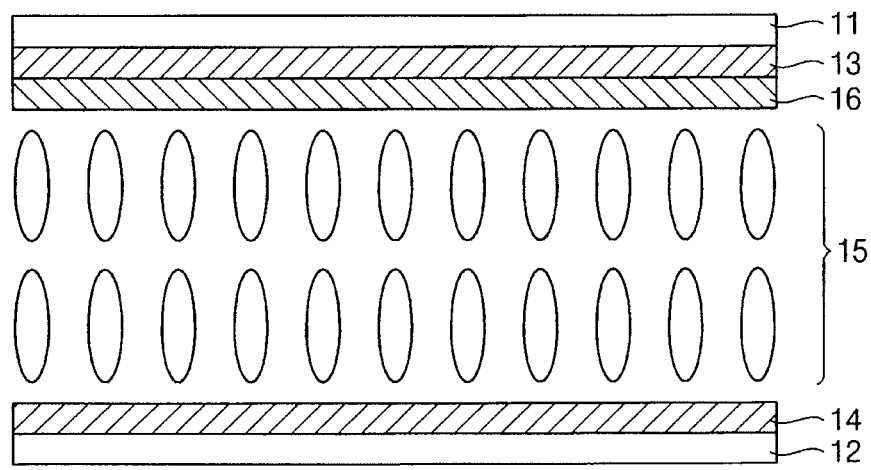
FIGS. 3A and 3B are cross-sectional views illustrating an operation of a comparable liquid crystal display device having a vertical alignment mode.
Figure 3B:
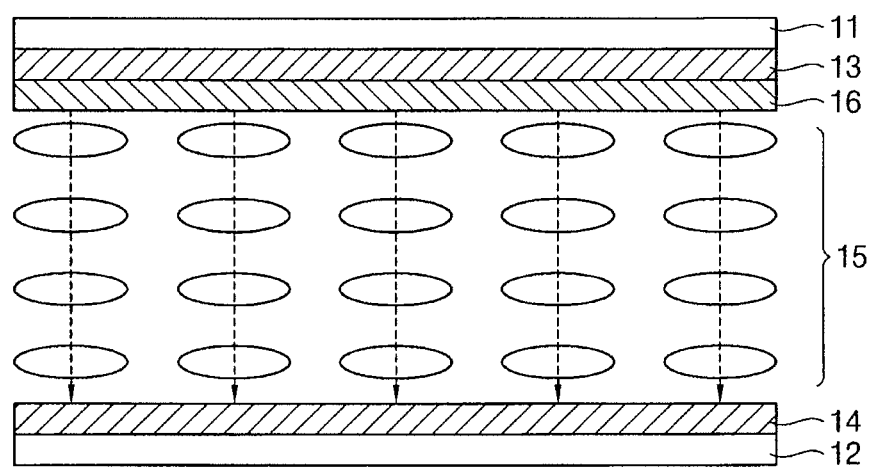
Figure 4A:
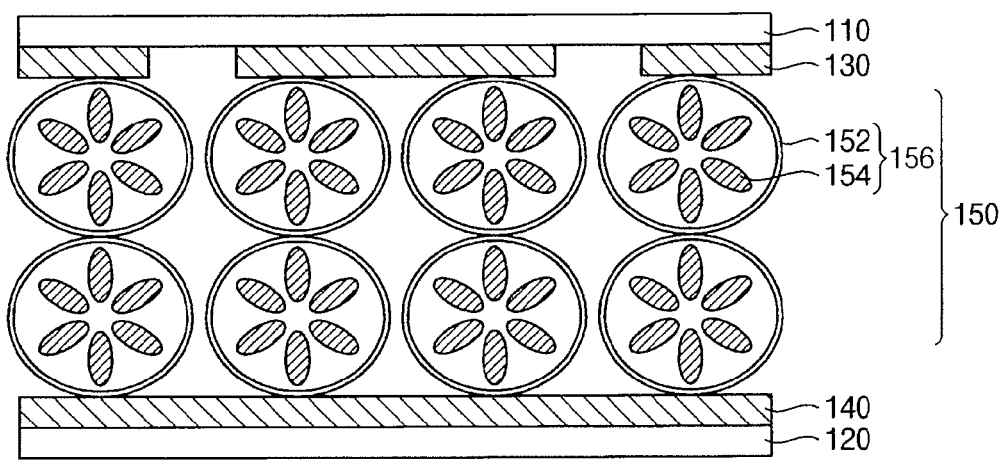
FIGS. 4A and 4B are cross-sectional views illustrating an operation of a liquid crystal display device in accordance with example embodiments.
Figure 4B:
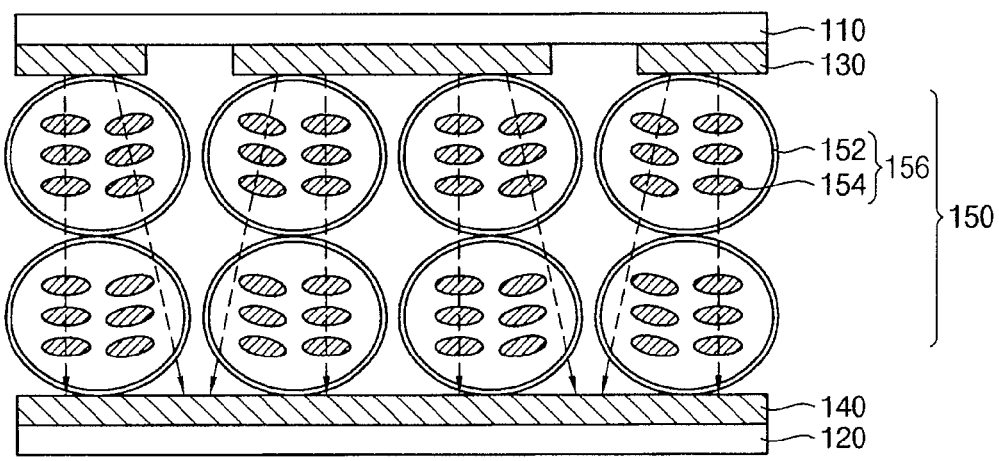

FIGS. 3A and 3B are cross-sectional views illustrating an operation of a comparable liquid crystal display device having a vertical alignment mode. FIGS. 4A and 4B are cross-sectional views illustrating an operation of a liquid crystal display device in accordance with example embodiments.

Referring to FIG. 3A, the comparable liquid crystal display device having the vertical alignment mode may include an alignment layer 16 disposed on a first substrate 11, so that liquid crystal molecules 15 may be aligned in a direction substantially perpendicular (or vertical) to the first substrate 11 with a first electrode 13 or a second substrate 12 with a second electrode 14. When a voltage is not applied to the comparable liquid crystal display device, the liquid crystal molecules 15 between the first and the second substrate 11 and 12 may be aligned vertically, such that light passing through the first substrate 11 and the alignment layer 16 may not be refracted by the liquid crystal molecules 15 and may be transmitted through the second substrate 12.

Referring to FIG. 3B, when a voltage is applied to the comparable liquid crystal display device, orientation of the liquid crystal molecules 15 may be changed according to the applied voltage, so that the liquid crystal molecules 15 may be aligned substantially in parallel to the first and/or second substrates 11 and 12, or substantially inclined at an angle (e.g., at a predetermined angle) relative to the first and/or second substrates 11 and 12. Light passing through the liquid crystal molecules 15 may be refracted, such that direction of the refracted light reaching the second substrate 12 may be changed according to the applied voltage. Thus, the comparable liquid crystal display device may operate in a gray mode or a white mode.

As illustrated in FIG. 4A, a liquid crystal display device according to example embodiments may include a liquid crystal structure 150 provided between a first substrate 110 and a second substrate 120 with a first electrode 130 and a second electrode 140, respectively. The liquid crystal structure 150 may include a plurality of liquid crystal capsules 156 including liquid crystal molecules 154 enclosed by a polymer layer 152. The liquid crystal capsules 156 may have diameters smaller (e.g., substantially smaller) than the shortest wavelength of visible light, and thus light may not be scattered by the liquid crystal capsules 156. Further, light may sufficiently pass through the liquid crystal structure 150 including the liquid crystal capsules 156. Therefore, the liquid crystal display device may have a simple construction and processes of manufacturing the liquid crystal display device may be simplified because an additional alignment layer may not be required. When a voltage is not applied to the liquid crystal structure 150 of the liquid crystal display device according to example embodiments, the liquid crystal molecules 154 received in the liquid crystal capsules 156 may be dispersed (or arranged) randomly relative to the first substrate 110 and/or the second substrate 120, or may be arranged in a direction at an angle (e.g., with a predetermined angle) relative to the first substrate 110 and/or the second substrate 120.

Referring to FIG. 4B, the liquid crystal molecules 154 in the liquid crystal capsules 156 may be orientated according to an electric field generated between the first and the second electrodes 130 and 140, so that light passing through the liquid crystal structure 150 may be refracted or scattered by the liquid crystal molecules 154. Direction of the light passing through the first substrate 110 or the second substrate 120 may depend on an applied voltage between the first and the second electrodes 130 and 140. Thus, the liquid crystal display device may operate in a gray mode or a white mode. For example, the electric field illustrated by the dotted lines in FIG. 4B may be generated between the first electrode 130 on the first substrate 110 and the second electrode 140 on the second substrate 120 when voltages are applied to the first electrode 130 and the second electrode 140. When the first electrode 130 and/or the second electrode 140 are formed to have various suitable structures as described above, the electric field may be distorted at the surfaces (or boundaries) of the first electrode 130 and/or the second electrode 140, and the orientation of the liquid crystal molecules 154 may be locally changed due to the distorted electric field, so that multiple domains (or multi domains) may be formed between the first and the second electrodes 130 and 140. Accordingly, the liquid crystal display device may provide (or ensure) a wide viewing angle (e.g., a required wide view angle).

Figure 5A:
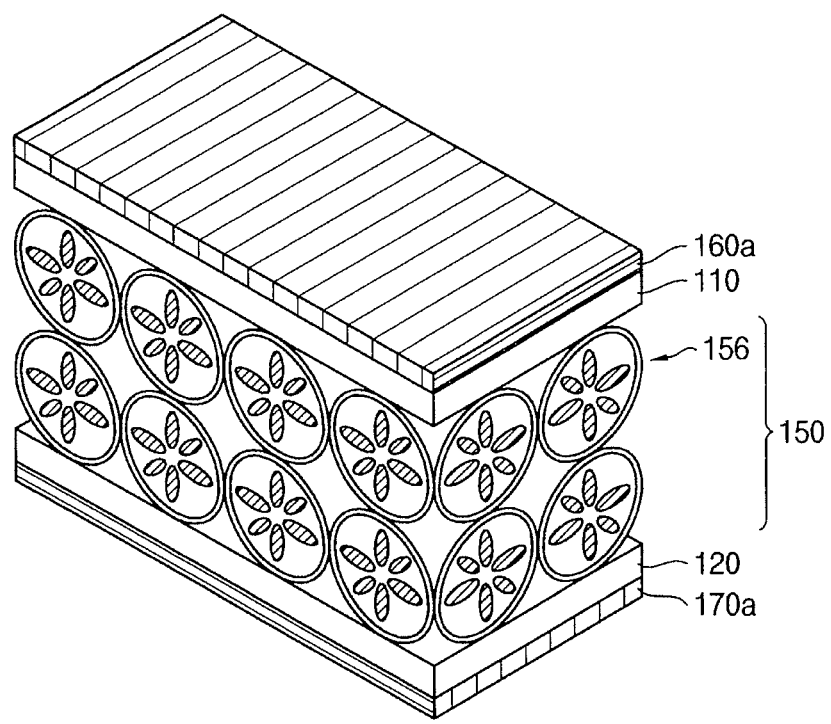
FIGS. 5A and 5B are perspective views illustrating a transmissive type liquid crystal display device in accordance with example embodiments.
Figure 5B:
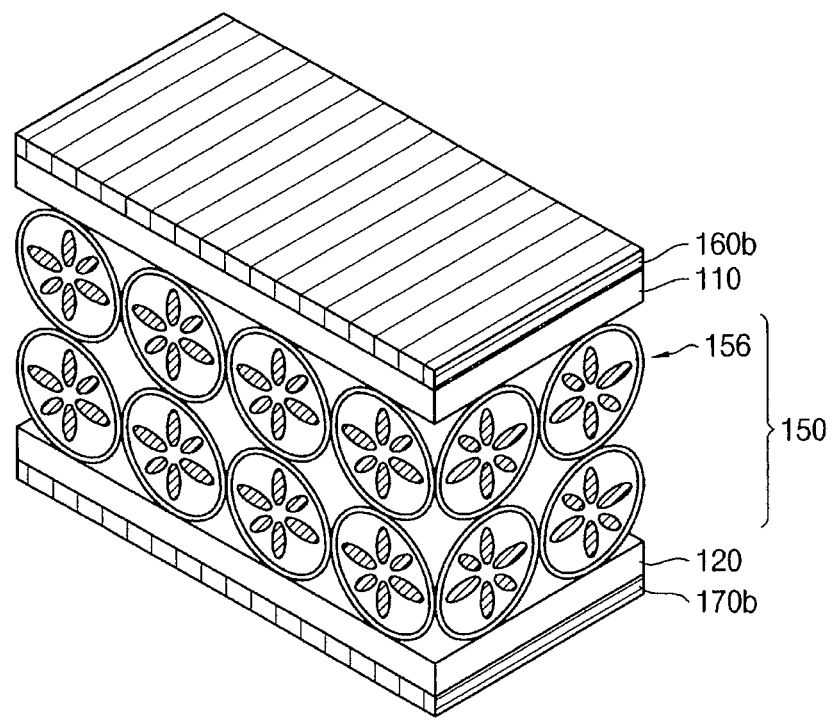

FIGS. 5A and 5B are perspective views illustrating a transmissive type liquid crystal display device in accordance with example embodiments.

Referring to FIG. 5A, the liquid crystal display device may include a first polarization plate 160a on a first substrate 110, and a second polarization plate 170a on a second substrate 120. The first polarization plate 160a and the second polarization plate 170a may have a first optical axis and a second optical axis, respectively. The first and the second polarization plates 160a and 170a may be substantially opposite to (i.e., facing oppositely away from) a first electrode and a second electrode disposed on the first substrate 110 and the second substrate 120, respectively. For example, when the first and the second electrodes are positioned respectively on first faces of the first and the second substrates 110 and 120, the first and the second polarization plates 160a and 170a may be located on second faces of the first and the second substrates 110 and 120, respectively.

In example embodiments, the first optical axis of the first polarization plate 160a may be disposed at an angle of about 90 degrees with respect to the second optical axis of the second polarization plate 170a. When voltages are not applied to the first and the second electrodes, light incident along the first optical axis from among the total light passing through the first polarization plate 160a may penetrate the first polarization plate 160a and the first substrate 110. The light along the first optical axis may not be scattered or refracted by the liquid crystal structure 150 including the liquid crystal capsules 156 having diameters smaller (e.g., substantially smaller) than the wavelength of visible light. Thus, the light along the first optical axis may reach the second substrate 120 and the second polarization plate 170a. However, when the second optical axis of the second polarization plate 170a has an angle of about 90 degrees relative to the first optical axis of the first polarization plate 160a, the light passing through the first polarization plate 160a along the first optical axis may not penetrate the second polarization plate 170a and the second substrate 120, so that the liquid crystal display device may display a dark image.

When the first electrode and/or the second electrode has various shapes as illustrated in FIGS. 2A to 2F, the liquid crystal molecules enclosed by the liquid crystal capsules 156 may have various orientation directions according to the electric field generated between the first and the second electrodes to provide multiple domains (or multi domains) between the first and the second electrodes. Therefore, the liquid crystal display device may have a wide viewing angle (or view angle) because the multiple domains (or multi domains) may be formed between the first and the second electrodes.

Referring to FIG. 5B, in some example embodiments, the first optical axis of the first polarization plate 160b may be substantially in parallel to the second optical axis of the second polarization plate 170b. In this case, light passing through the first polarization plate 160b, the first substrate 110, and the liquid crystal structure 150 may reach the second substrate 120 without scattering or refraction of the light, and then may pass through the second polarization plate 170b having the second optical axis substantially in parallel to the first optical axis. Therefore, the liquid crystal display device may display a white image.

According to example embodiments, a liquid crystal display device may have a liquid crystal structure including a plurality of liquid crystal capsules having a diameter smaller (e.g., substantially smaller) than the shortest wavelength of visible light. Visible light may be transmitted through the liquid crystals molecules so that an additional alignment layer may not be required to control initial alignment of the liquid crystal molecules. Additionally, movement of the liquid crystal molecules may be controlled by the liquid crystal capsules, such that a spacer or a supporting member may not be required to place the liquid crystal molecules uniformly in pixel regions of the liquid crystal display device. As a result, a pooling effect and/or bruising effect caused by displacement of the liquid crystal molecules may be effectively reduced or avoided when a user presses a first substrate and/or a second substrate to operate the liquid crystal display device.

Figure 6:
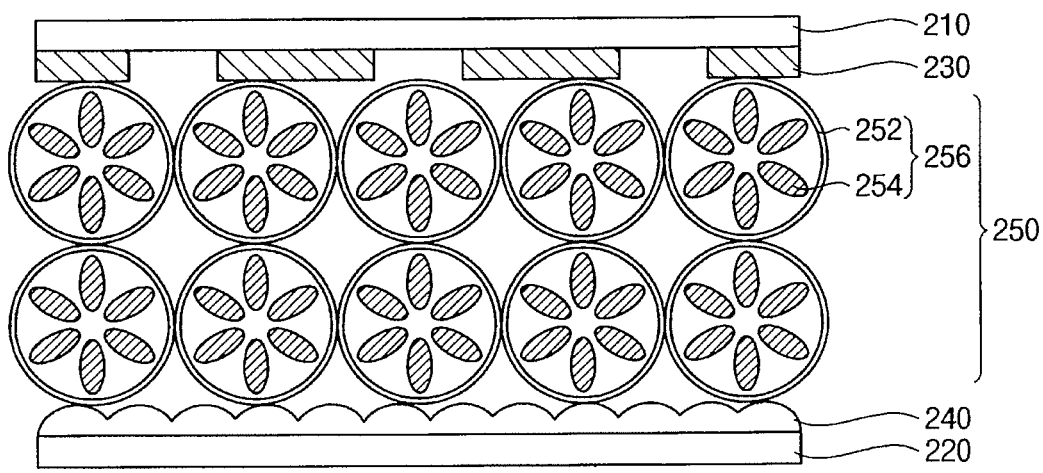

FIG. 6 is a cross-sectional view illustrating a reflective type liquid crystal display device in accordance with example embodiments.

Referring to FIG. 6, a liquid crystal display device 200 may include a first substrate 210, a second substrate 220, a first electrode 230, a reflection layer 240 and a liquid crystal structure 250.

The first substrate 210 may include a transparent substrate such as a glass substrate, a transparent polymer substrate, a transparent ceramic substrate, a transparent metal oxide substrate, etc. Wirings such as a gate line and/or a date line may be provided on the first substrate 210 and switching devices such as thin film transistors (TFTs) may also be positioned on the first substrate 210.

The second substrate 220 may be substantially facing the first substrate 210. The second substrate 220 may also include a transparent substrate such as a glass substrate, a transparent polymer substrate, a transparent metal oxide substrate, etc.

In example embodiments, the second substrate 220 may include a black matrix substantially corresponding to the switching device provided on the first substrate 210.

The first electrode 230 may be disposed on the first substrate 210. The first electrode 230 may include a transparent conductive material such as ITO, IZO, zinc oxide, tin oxide, FTO, etc. These may be used alone or in a combination thereof. The first electrode 230 may be formed to have various suitable structures such as those of the first electrode described with reference to FIGS. 2A to 2F.

The reflection layer 240 may be located on the second substrate 220. The reflection layer 240 may include a material having a relatively high reflectivity. For example, the reflection layer 240 may include metal such as aluminum (Al), chrome (Cr), molybdenum (Mo), platinum (Pt), an alloy thereof, etc. These may be used alone or in a combination thereof.

In example embodiments, the liquid crystal display device 200 having the reflective type may include (or provide) the liquid crystal structure 250 with external light to display images thereon. The reflection layer 240 on the second substrate 220 may reflect the external light passing through the first substrate 210, so that the reflective type liquid crystal display device 200 may provide (or ensure) improved luminance. The reflection layer 240 may have a uniform thickness to enhance luminance of incident light. Alternatively, the reflection layer 240 may have a plurality of convex portions (i.e., rugged portions) thereon. For example, the reflection layer 240 may have a plurality of lenses.

The liquid crystal structure 250 may be positioned between the first electrode 230 on the first substrate 210 and the reflection layer 240 on the second substrate 220. The liquid crystal structure 250 may include a plurality of liquid crystal capsules 256 having a polymer layer 252 and liquid crystal molecules 254 enclosed by the polymer layer 252. In example embodiments, the liquid crystal molecules 254 may have a positive dielectric anisotropy or a negative dielectric anisotropy so as to obtain a white mode or a black mode, respectively.

The liquid crystal capsules 256 may have diameters in a range of about 10 nm to about 380 nm. When the liquid crystal capsules 256 have the diameters of about 10 nm to about 380 nm, visible light may not be scattered or refracted by the liquid crystal capsules 256, and may sufficiently pass through the liquid crystal structure 250 because the shortest wavelength of visible light may be larger (e.g., substantially larger) than the diameters of the liquid crystal capsules 256. Because the liquid crystal capsules 256 may be optically isotropic, the liquid crystal display device 200 having the reflective type may have a wide viewing angle (e.g., a desired wide view angle) without an additional alignment layer for controlling an initial orientation of the liquid crystal molecules 254.

Figure 7:
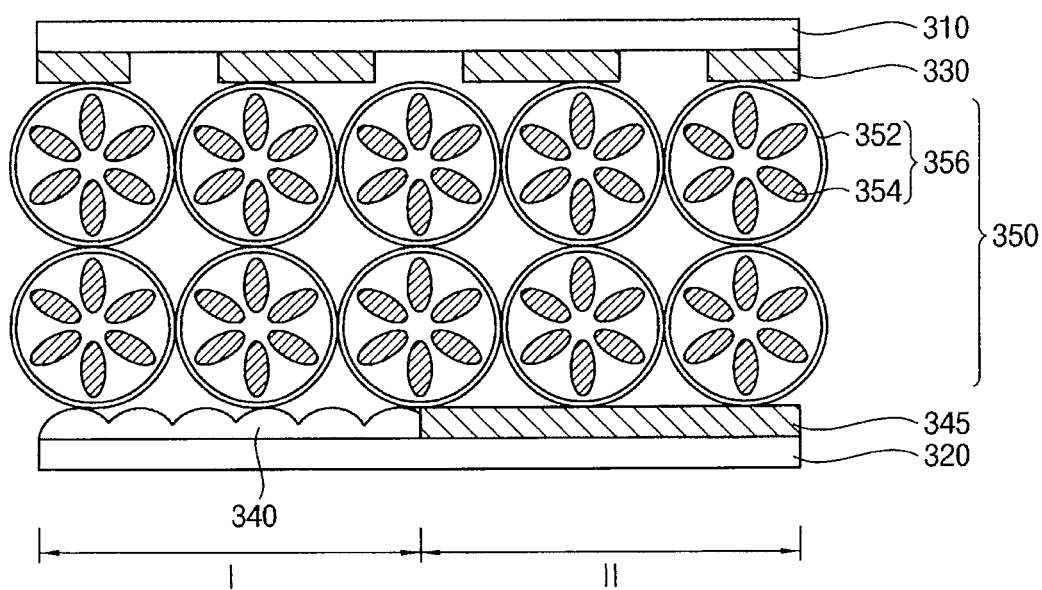

FIG. 7 is a cross-sectional view illustrating a transflective type liquid crystal display device in accordance with example embodiments.

Referring to FIG. 7, a transflective type liquid crystal display device 300 may include a first region I and a second region II. The liquid crystal display device 300 may have a first substrate 310, a first electrode 330, a liquid crystal structure 350, a second substrate 320, a reflection layer 340 and a second electrode 345. The first substrate 310, the second substrate 320, the first electrode 330, the liquid crystal structure 350 and the reflection layer 340 may be positioned in all of the first region I and the second region II. The second electrode 345 may be located in the second region II only. The liquid crystal structure 350 may include liquid crystal capsules 356 having liquid crystal molecules 354 received in polymer layers 352.

The first region I of the liquid crystal display device 300 may have a construction substantially the same as or substantially similar to that of the liquid crystal display device described with reference to FIG. 6. The second region II of the liquid crystal display device 300 may have a construction substantially the same as or substantially similar to that of the liquid crystal display device described with reference to FIG. 1.

In the transflective type liquid crystal display device 300 according to example embodiments, each pixel region may include the first region I and the second region II. Here, the first region I and the second region II may serve as a reflective region and a transmissive region, respectively. A first portion of the liquid crystal structure 350 in the first region I may have a thickness substantially the same as or substantially similar to that of a second portion of the liquid crystal structure 350 in the second region II, so that the liquid crystal display device 300 may have a substantially single cell gap. Alternatively, the first portion of the liquid crystal structure 350 may have a thickness different (e.g., substantially different) from that of the second portion of the liquid crystal structure 350.

According to example embodiments, a liquid crystal display device may have a liquid crystal structure including a plurality of liquid crystal capsules having diameters smaller (e.g., substantially smaller) than the shortest wavelength of visible light. Thus, visible light may pass through liquid crystal molecules of the liquid crystal structure without an additional retardation film and/or an additional alignment layer for controlling initial alignment of the liquid crystal molecules. Additionally, movement of the liquid crystal molecules may be controlled by polymer layers of the liquid crystal capsules, so that a spacer or a supporting member may not be required to place the liquid crystal molecules in pixel regions of the liquid crystal display device. As a result, a pooling effect and/or bruising effect caused by displacement of the liquid crystal molecules may be effectively reduced or prevented.

Figure 8:
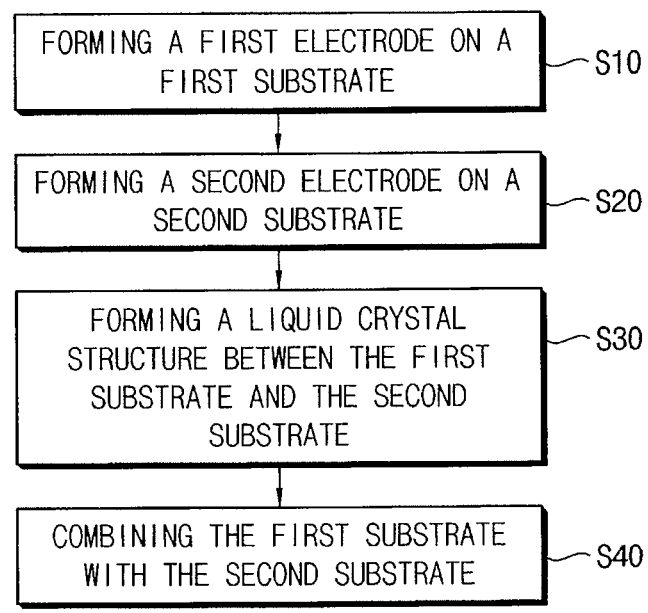

FIG. 8 is a flow chart illustrating a method of manufacturing a liquid crystal display device in accordance with example embodiments.

Referring to FIG. 8, a first conductive layer may be formed on a first substrate, and then the first conductive layer may be patterned to form a first electrode on the first substrate in step S10. The first substrate may include a transparent insulation material such as glass, transparent polymer, transparent metal oxide, etc. The first conductive layer may be formed using a transparent conductive material by a printing process, a spraying process, a deposition process, etc. For example, the first conductive layer may be formed using ITO, IZO, zinc oxide, tin oxide, FTO, etc. These may be used alone or in a combination thereof.

In example embodiments, the first electrode may be obtained on the first substrate by patterning the first conductive layer through a photolithography process or an etching process using an etching mask (e.g., an additional etching mask). The first electrode may be formed to have various structures substantially the same as or substantially similar to those of the first electrodes described with reference to FIGS. 2A to 2F.

A second electrode may be formed on a second substrate in step S20. The second substrate may include a transparent insulation material such as glass, transparent polymer, transparent metal oxide, etc. The second electrode may be formed using a transparent conductive material such as ITO, IZO, zinc oxide, tin oxide or FTO by a printing process, a spraying process, a deposition process, etc. In example embodiments, the second electrode may be formed on the second substrate using a material substantially the same as or substantially similar to that of the first electrode. Alternatively, the second electrode may include a material different (e.g., substantially different) from that of the first electrode.

In example embodiments, the second electrode may be formed on the second substrate by a photolithography process or an etching process using an etching mask (e.g., an additional etching mask). For example, a second conductive layer may be formed on the second substrate, and then the second conductive layer may be patterned to form the second electrode on the second substrate. In this case, the second electrode may also be formed to have various suitable structures as illustrated in FIGS. 2A to 2F. In some example embodiments, the second electrode may have a shape substantially the same as or substantially similar to that of the first electrode. Alternatively, the first electrode may be formed to have a structure different (e.g., substantially different) from that of the second electrode.

Referring now to FIG. 8, a liquid crystal structure may be formed between the first and the second substrates in step S30. In example embodiments, a plurality of liquid crystal capsules having liquid crystal molecules enclosed by polymer layers may be printed on the first substrate and/or the second substrate. For example, the liquid crystal capsules may be formed on the first substrate and/or the second substrate by a roll printing process. Alternatively, the liquid crystal capsules may be formed on first substrate and/or the second substrate by a spraying process.

In step S40, the first and the second substrates may be combined with each other while interposing the liquid crystal structure between the first and the second substrates to obtain a liquid crystal display device. The first and the second substrates may be combined with each other using a sealing member such as a sealant. In example embodiments, the liquid crystal capsules of the liquid crystal structure may be formed using a high pressure homogenizer. The high pressure homogenizer may subdivide the liquid crystal molecules existing in a fluid to have minute sizes under a relatively high pressure, and may subsequently inject the fluid under a relatively low pressure to thereby obtain dispersed liquid crystal molecules having desired minute sizes. For example, liquid crystal molecules with sizes of several nanometers to dozens of nanometers may be dispersed using the high pressure homogenizer. In example embodiments, the liquid crystal molecules may have diameters in a range of about 10 nm to about 380 nm.

Figure 9:
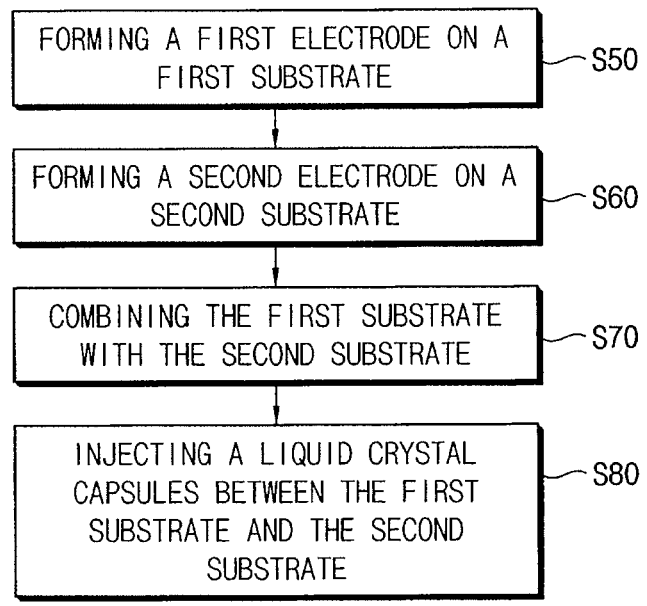

FIG. 9 is a flow chart illustrating a method of manufacturing a liquid crystal display device in accordance with example embodiments.

Referring to FIG. 9, a first electrode may be formed on a first substrate including a transparent insulation substrate in step S50. A second electrode may be formed on a second substrate including a transparent insulation substrate in step S60. Each of the first and the second electrodes may be obtained by patterning conductive layers after forming the conductive layers on the first and the second substrates, respectively. In example embodiments, processes of forming the first and the second electrodes and materials including the first and the second electrodes may be substantially the same as or substantially similar to the processes and the materials for the first and the second electrodes described with reference to FIG. 8. Additionally, at least one of the first and the second electrodes may be formed to have various shapes substantially the same as or substantially similar to those of the first electrode described with reference to FIGS. 2A to 2F.

In step S70, the first substrate and the second substrate may be combined with each other using a sealing member. A liquid crystal structure may be injected between the first substrate and the second substrate in step S80. The liquid crystal structure may include a plurality of liquid crystal capsules including liquid crystal molecules enclosed by polymer layers. The liquid crystal capsules may be obtained using a high pressure homogenizer.

In a comparable liquid crystal display device having a vertical alignment mode, a vertical alignment layer may be formed on a substrate so as to align liquid crystal molecules in a direction substantially perpendicular (or vertical) relative to the substrate. Additionally, when a rubbing process is performed about the vertical alignment layer to generate multiple domains (or multi domains) in a pixel region, processes of manufacturing the comparable liquid crystal display device may be complicated and also a rubbing mark or a blemish may be generated during the manufacturing processes. However, a liquid crystal display device according to example embodiments may include a liquid crystal structure containing liquid crystal molecules having diameters of about 10 nm to about 380 nm, such that an additional vertical alignment layer or a retardation layer may not be required. Further, the liquid crystal structure according to example embodiments may be optically isotropic and at least one electrode may have a structure to generate multiple domains (or multi domains) in a pixel region, thereby simplifying processes of manufacturing the liquid crystal display device.

Figure 10:
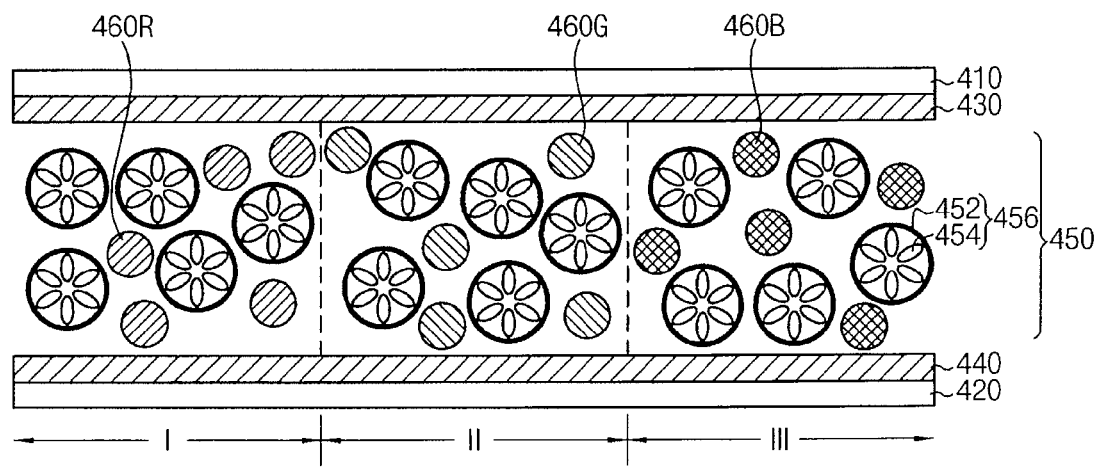

FIG. 10 is a cross-sectional view illustrating a liquid crystal display device in accordance with example embodiments. The liquid crystal display device may have a construction substantially the same as or substantially similar to that of the liquid crystal display device described with reference to FIG. 1, except for a configuration of a liquid crystal structure.

Referring to FIG. 10, a liquid crystal display device 400 may include a first substrate 410, a second substrate 420, a first electrode 430, a second electrode 440 and a liquid crystal structure 450. In example embodiments, the liquid crystal display device 400 may have a first region I, a second region II and a third region III. The first region I may include a red pixel region and the second region II may include a green pixel region. Further, the third region III may include a blue pixel region.

The first electrode 430 may be positioned on the first substrate 410, and the second electrode 440 may be positioned on the second substrate 420. The first electrode 430 and/or the second electrode 440 may have a shape substantially the same as or substantially similar to those described with reference to FIG. 2A to 2F.

The liquid crystal structure 450 may be disposed between the first electrode 430 on the first substrate 410 and the second electrode 440 on the second substrate 420. The liquid crystal structure 450 may include a plurality of liquid crystal capsules 456, a red pigment structure 460R, a green pigment structure 460G and a blue pigment structure 460B.

Each of the liquid crystal capsules 456 may include a polymer layer 452 and liquid crystal molecules 454 received in the polymer layer 452. For example, each of the liquid crystal capsules 456 may have a diameter of about 10 nm to about 380 nm. When each liquid crystal capsules 456 have a diameter of about 10 nm to 380 nm, the wavelength of visible light may be larger (e.g., substantially larger) than the diameter of each liquid crystal capsule 456, so that visible light may pass through the liquid crystal structure 450 including liquid crystal capsules 456 without scattering of visible light.

In example embodiments, the red, the green and the blue pigment structures 460R, 460G and 460B may include red, green and blue pigments, respectively, together with binders and dispersing agents. For example, the red pigment structure 460R may include a red pigment or a red dye with a binder and a dispersing agent. The liquid crystal structure 450 including the red pigment structure 460R may be positioned in the first region I of the liquid crystal display device 400. The green pigment structure 460G may include a green pigment or a green dye with a binder and a dispersing agent. The liquid crystal structure 450 including the green pigment structure 460G may be disposed in the second region II of the liquid crystal display device 400. The blue pigment structure 460B may include a blue pigment or a blue dye with a binder and a dispersing agent. The liquid crystal structure 450 including the blue pigment structure 460B may be located in the third region III of the liquid crystal display device 400.

In example embodiments, each of the red, the green and the blue pigment structures 460R, 460G and 460B may further include an additive such as a monomer, an initiator, a coupling agent, a leveling agent or a surface-active agent. When the red, the green and the blue pigment structures 460R, 460G and 460B are formed by an exposure process and a developing process, the additive may be used to initiate a polymerization reaction or to form a smooth interface. For example, the liquid crystal structure 450 including the red pigment structure 460R and the liquid crystal capsules 456 may be positioned in the first region I of the liquid crystal display device 400 which may include the red pixel region, so that a red colored image may be displayed in the first region I when visible light passes through the liquid crystal structure 450.

In example embodiments, the liquid crystal display device may have the liquid crystal structures including the red, the green and the blue pigment structures together with the liquid crystal capsules in the red, the green and the blue pixel regions of the liquid crystal display device, so that full color images including red, green and blue images may be displayed without a color filter.

Figure 11A:
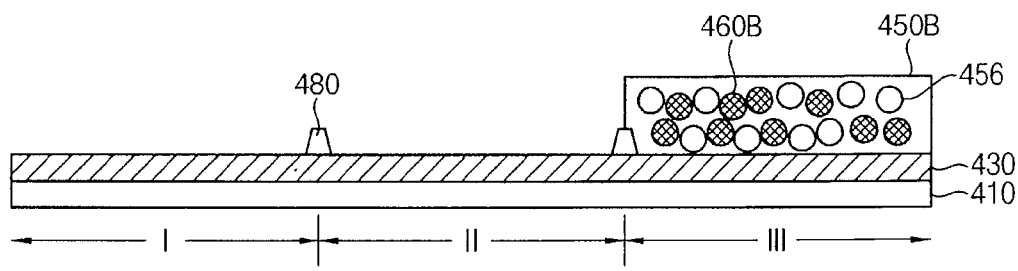
FIGS. 11A to 11C are cross-sectional views illustrating a method of manufacturing a liquid crystal display device in accordance with example embodiments.
Figure 11B:
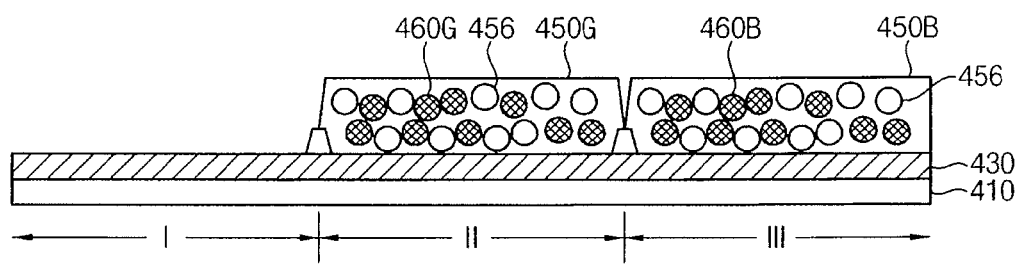
Figure 11C:
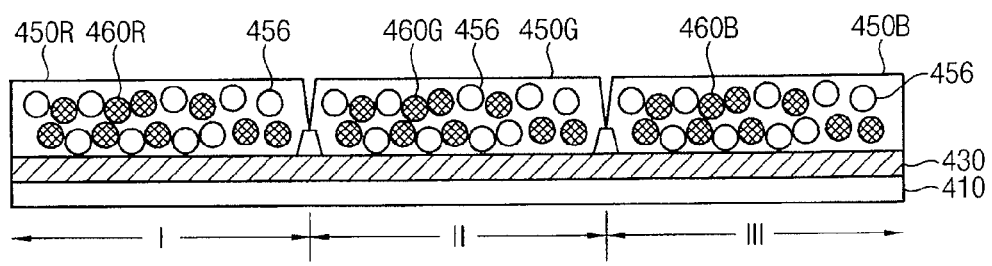

FIGS. 11A to 11C are cross-sectional views illustrating a method of manufacturing a liquid crystal display device in accordance with example embodiments.

Referring to FIG. 11A, a first electrode 430 may be formed on a first substrate 410, and a blue mixture including a blue pigment structure 460B and liquid crystal capsules 456 may be coated in a third region III of the first substrate 410. In example embodiments, the blue mixture may be formed on the first electrode 430 using a printing process such as an inkjet printing process, a gravure printing process, an offset printing process, a gravure offset printing process, a flexo printing process, etc.

In example embodiments, the blue mixture including the blue pigment structure 460B and the liquid crystal capsules 456 may be obtained by adding liquid crystal capsules, blue pigments or blue dyes, a binder and an additive such as a coupling agent or a leveling agent into a solvent. In example embodiments, the binder may include a copolymer having a first portion including an acid soluble in an alkali solution and a second portion maintaining a hardness of a layer. For example, the binder may include acrylic acid copolymer or ester copolymer which may contain at least one carboxyl group or a functional group. In some example embodiments, the binder may further include novolac-type copolymers or cardo-type copolymers. The additive may include a silane coupling agent, a fluorine-type surface-active agent, an anti-oxidation agent, a polymerization prohibitor, an ultraviolet (UV) absorbent, an anticoagulant, a linking agent, etc. The additive may be used to improve coating characteristics, leveling characteristics or adhesion characteristics of a coated layer.

In some example embodiments, barrier ribs 480 may be formed on the first substrate 410. For example, the barrier ribs 480 may be positioned at boundaries of the first to the third regions I, II and III, so that color mixtures in pixel regions may not overflow into adjacent pixel regions. Therefore, color mixing of adjacent pixels may be effectively prevented.

The blue mixture, which include the blue pigment structure 460B and the liquid crystal capsules 456 positioned in the third region III, may be cured or dried to form a blue liquid crystal structure 450B including the blue pigment structure 460B and the liquid crystal capsules 456 in the third region III.

Referring to 11B, a green mixture including a green pigment structure 460G and liquid crystal capsules 456 may be coated in the second region II of the first substrate 410. In example embodiments, the green mixture may be formed on the first electrode 430 by a printing process. The green mixture including the green pigment structure 460G and the liquid crystal capsules 456 may be formed by processes substantially the same as or substantially similar to those for forming the blue mixture including the blue pigment structure 460B and the liquid crystal capsules 456.

The green mixture including the green pigment structure 460G and the liquid crystal capsules 456 positioned on the second region II may be cured or dried to form a green liquid crystal structure 450G including the green pigment structure 460G and the liquid crystal capsules 456 in the second region II.

Referring to 11C, a red mixture including a red pigment structure 460R and liquid crystal capsules 456 may be formed in the first region I of the first substrate 410. In example embodiments, the red mixture may be formed on the first electrode 430 by a printing process. The red mixture including the red pigment structure 460R and the liquid crystal capsules 456 may be formed by processes substantially the same as or substantially similar to those for forming the blue mixture including the blue pigment structure 460B and the liquid crystal capsules 456.

The red mixture including the red pigment structure 460R and the liquid crystal capsules 456 positioned in the first region I may be cured or dried to form a red liquid crystal structure 450R including the red pigment structure 460R and the liquid crystal capsules 456 in the first region I.

The first substrate 410 having the blue liquid crystal structure 450B, the green liquid crystal structure 450G and the red liquid crystal structure 450R may be combined with a second substrate (not illustrated) having a second electrode (not illustrated) thereon. Thus, the liquid crystal display device including the red, the green and the blue liquid crystal structures 450R, 450G and 450B between the first substrate 410 and the second substrate may be obtained.

According to example embodiments, the red, the green and the blue liquid crystal structures including the red, the green and the blue pigment structures and the liquid crystal capsules may be provided in the red, the green and the blue pixel regions of the liquid crystal display device. Therefore, the liquid crystal display device having a simple construction may display red, green and blue images without a color filter or a retardation film, and also processes for manufacturing the liquid crystal display device may be simplified.

FIGS. 12A to 12I are cross-sectional views illustrating a method of manufacturing a liquid crystal display device in accordance with example embodiments.

Figure 12A:
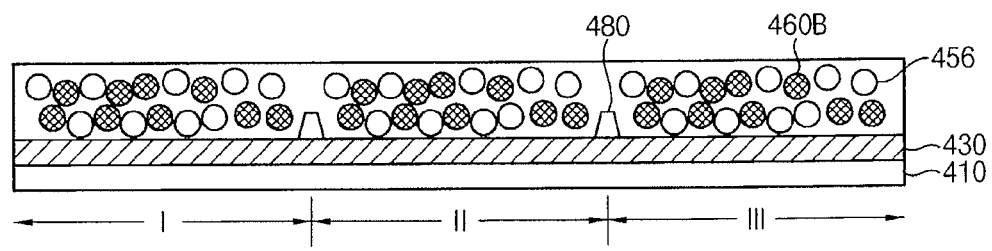
FIGS. 12A to 12I are cross-sectional views illustrating a method of manufacturing a liquid crystal display device in accordance with example embodiments.

Referring to FIG. 12A, a first electrode 430 may be formed on a first substrate 410, and a preliminary blue liquid crystal structure 470B including a blue pigment structure 460B and liquid crystal structures 456 in a first region I, a second region II and a third region III of the first substrate 410.

In example embodiments, the preliminary blue liquid crystal 470B may be obtained by adding liquid crystal capsules 456, blue pigments or blue dyes, a binder, a monomer, an initiator and an additive such as a coupling agent or a leveling agent into a solvent. In example embodiments, the binder may include a copolymer having a first portion including an acid soluble in an alkali solution and a second portion maintaining a hardness of a coating layer. For example, the binder may include acrylic acid copolymer or ester copolymer which may have at least one carboxyl group or a functional group. In some example embodiments, the binder may additionally include novolac-type copolymers or cardo-type copolymers. The monomer may have a functional group which may react to a radical reaction initiated by the initiator. In example embodiments, the monomer may include acrylate monomers. The initiator may initiate a radical reaction in an exposure process. For example, the additive may include a silane coupling agent, a fluorine-typed surface-active agent, an anti-oxidation agent, a polymerization prohibitor, a UV absorbent, an anticoagulant or a linking agent. The additive may be used to improve coating characteristics, leveling characteristics or adhesion characteristics of a coated layer.

In example embodiments, the preliminary blue liquid crystal structure 470B including the blue pigment structure 460B and the liquid crystal capsules 456 may be formed by a spin coating process or a slit coating process. Barrier ribs 480 may be additionally formed on the first substrate 410. The barrier ribs 480 may be located at boundaries of the first region to the third region I, II and III, so that color mixtures of pixel regions may not overflow into adjacent pixel regions without color mix of adjacent pixel regions.

Figure 12B:
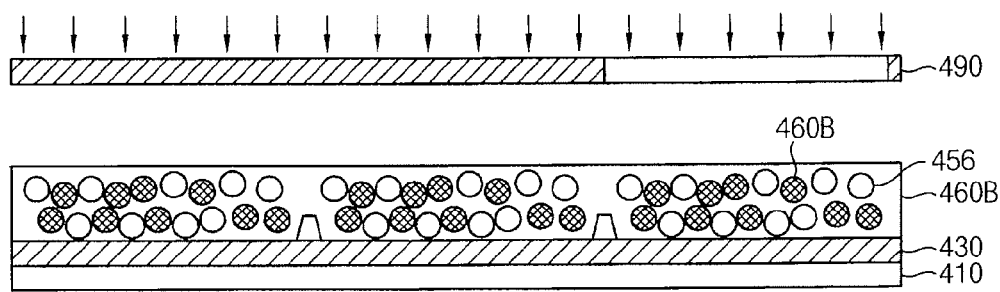

Referring to FIG. 12B, a first mask 490 covering the first and the second regions I and II and exposing the third region III may be positioned over the first substrate 410. The preliminary blue liquid crystal structure 470B in the third region III may be selective exposed to light using the first mask 490. For example, the preliminary blue liquid crystal structure 470B may be exposed to an ultraviolet ray.

Figure 12C:
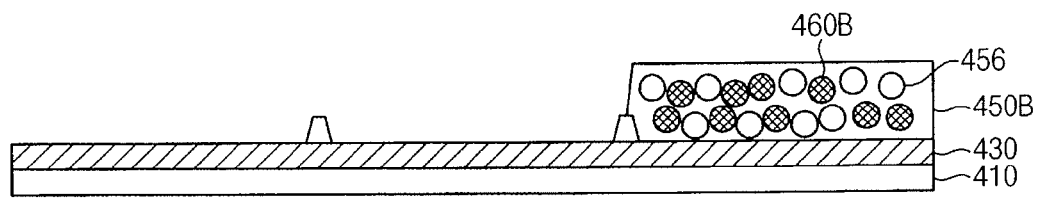

Referring to FIG. 12C, a curing (hardening) process and a developing process may be performed about the preliminary blue liquid crystal structure 470B in the first to the third regions I, II and III of the first substrate 410, such that portions of the preliminary blue liquid crystal structure 470B in the first and the second regions I and II may be removed. Therefore, a blue liquid crystal structure 450B including the blue pigment structure 460B and the liquid crystal capsules 456 may be formed in the third region III of the first substrate 410.

Figure 12D:
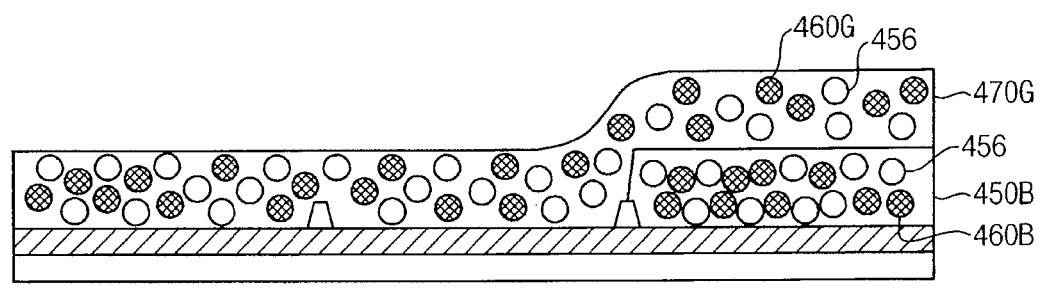

Referring to FIG. 12D, a preliminary green liquid crystal structure 470G including a green pigment structure 460G and liquid crystal capsules 456 may be formed in the first to the third regions I, II and III of the first substrate 410. The preliminary green liquid crystal structure 470G may be formed by processes substantially the same as or substantially similar to those for forming the preliminary blue liquid crystal structure 470B.

Figure 12E:
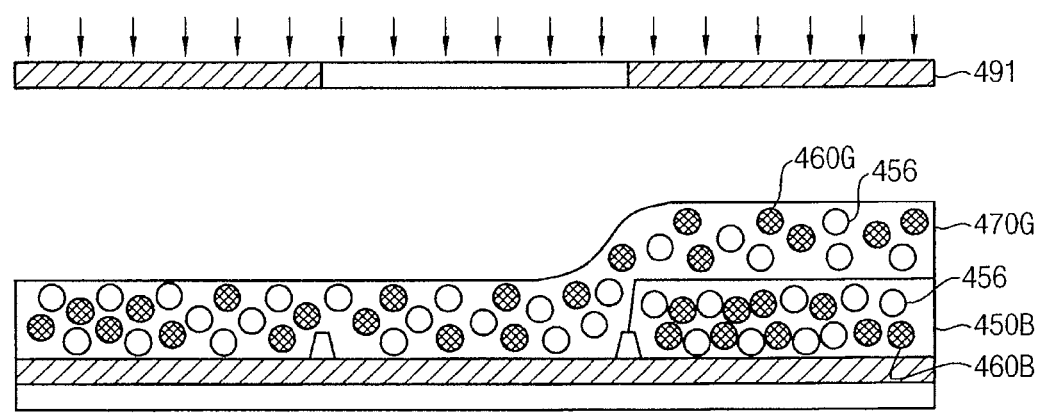

Referring to FIG. 12E, a second mask 491 covering the first and the third regions I and III and exposing the second region II may be provided over the first substrate 410. The preliminary green liquid crystal structure 470G in the second region II may be exposed to light using the second mask 491.

Figure 12F:
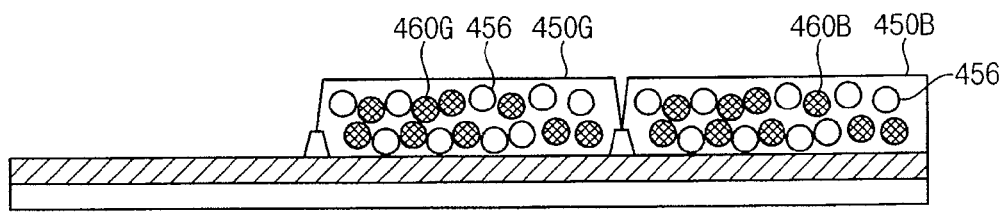

Referring to FIG. 12F, a curing (hardening) process and a developing process may be executed on the preliminary green liquid crystal structure 470G in the first to the third regions I, II and III of the first substrate 410, to thereby remove portions of the preliminary green liquid crystal structure 470G in the first and the third regions I and III of the first substrate 410. Thus, a green liquid crystal structure 450G including the green pigment structure 460G and the liquid crystal capsules 456 may be provided in the second region II of the first substrate 410. While the green liquid crystal structure 450G is formed, the blue liquid crystal structure 450B including the blue pigment structure 460B and the liquid crystal capsules 456 formed in the third region III may not be removed. Thus, the green liquid crystal structure 450G may be positioned in the second region II adjacent to the blue liquid crystal structure 450B in the third region III.

Figure 12G:
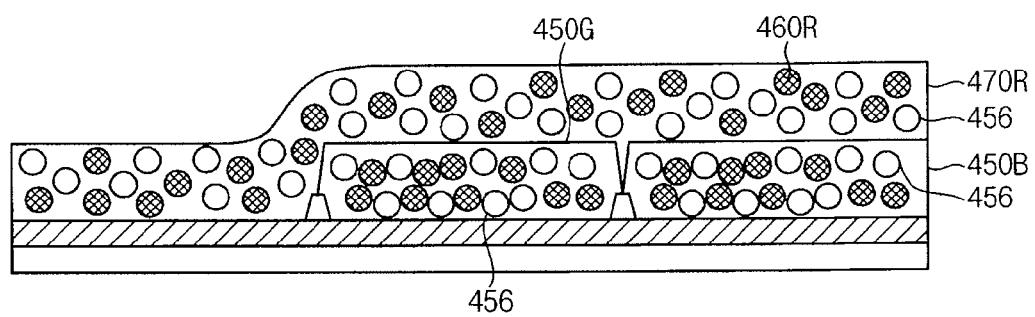

Referring to FIG. 12G, a preliminary red liquid crystal structure 470R including a red pigment structure 460R and liquid crystal capsules 456 may be formed in the first to the third regions I, II and III of the first substrate 410. The preliminary red liquid crystal structure 470R may be formed by processes substantially the same as or substantially similar to those for forming the preliminary blue liquid crystal structure 470B.

Figure 12H:
Figure 12H:
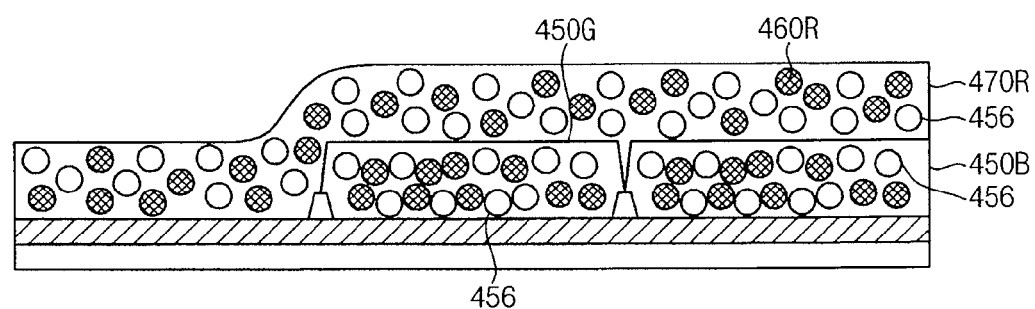

Referring to FIG. 12H, a third mask 492 covering the second and the third regions II and III and exposing the first region I may be disposed over the first substrate 410. The preliminary red liquid crystal structure 470R in the first region I may be exposed to light using the third mask 492.

Figure 12I:
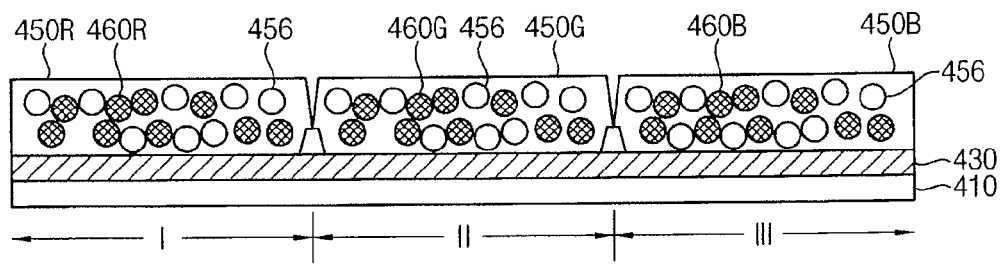

Referring to FIG. 12I, a curing process and a developing process may be carried out about the preliminary red liquid crystal structure 470R in the first to the third regions I, II and III of the first substrate 410, thereby removing portions of the preliminary red liquid crystal structure 470R in the second and the third regions II and III of the first substrate 410. Hence, a red liquid crystal structure 450R including the red pigment structure 460R and the liquid crystal capsules 456 may be formed in the first region I of the first substrate 410.

While the red liquid crystal structure 450G is formed, the blue liquid crystal structure 450B including the blue pigment structure 460B and the liquid crystal capsules 456 formed in the third region III and the green liquid crystal structure 450G including the green pigment structure 460G and the liquid crystal capsules 456 in the second region II may not be removed.

The first substrate 410 having the blue liquid crystal structure 450B, the green liquid crystal structure 450G and the red liquid crystal structure 450R may be combined with a second substrate (not illustrated) having a second electrode (not illustrated) thereon. Therefore, the liquid crystal display device including the red, the green and the blue liquid crystal structures 450R, 450G and 450B between the first substrate 410 and the second substrate may be obtained. The red liquid crystal structure 450R including the red pigment structure 460R may be positioned in the first region I of the liquid crystal display device, the green liquid crystal structure 450G including the green pigment structure 460G may be disposed in the second region II of the liquid crystal display device, and the blue liquid crystal structure 450B including the blue pigment structure 460B may be located in the third region III of the liquid crystal display device.

Figure 13:
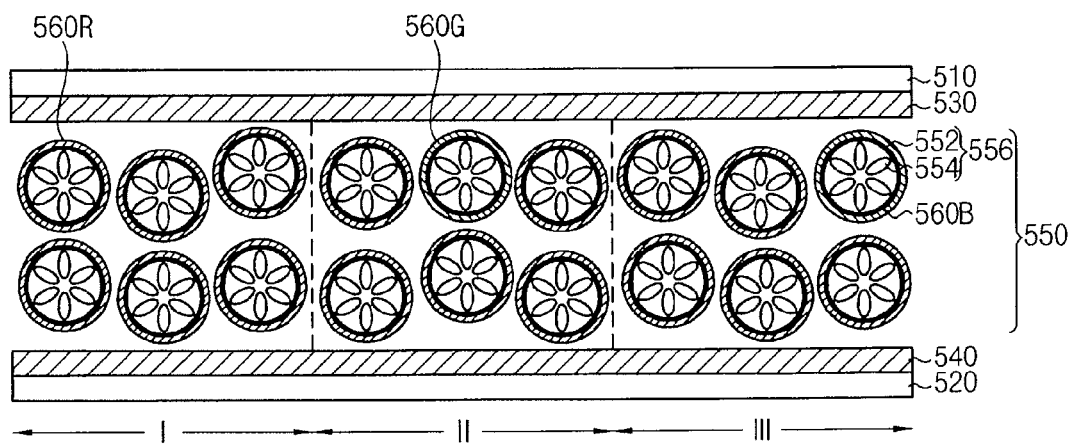

FIG. 13 is a cross-sectional view illustrating a liquid crystal display device in accordance with example embodiments. The liquid crystal display device illustrated in FIG. 13 may have a construction substantially the same as or substantially similar to that of the liquid crystal display device described with reference to FIG. 1 except for a liquid crystal structure.

Referring to FIG. 13, the liquid crystal display device 500 may include a first substrate 510, a second substrate 520, a first electrode 530, a second electrode 540 and a liquid crystal structure 550. The liquid crystal display device 500 may have a first region I, a second region II and a third region III. The first region I may include a red pixel region, the second region II may have a green pixel region and the third region III may include a blue pixel region.

The first electrode 530 may be disposed on the first substrate 510 and the second electrode 540 may be located on the second substrate 520. The first electrode 530 and/or the second electrode 540 may have a shape substantially the same or substantially similar to those described with reference to FIGS. 2A to 2F.

In example embodiments, the liquid crystal structure 550 may be positioned between the first electrode 530 on the first substrate 510 and the second electrode 540 on the second substrate 520. The liquid crystal structure 550 may include a plurality of liquid crystal capsules 556 and red, green and blue pigment coating layers 560R, 560G and 560B. Each of the liquid crystal capsules 556 may include a polymer layer 552 and liquid crystal molecules 554 received in the polymer layer 552. For example, each of the liquid crystal capsules 556 may have a diameter of about 10 nm to about 380 nm. When the liquid crystal capsules 556 have a diameter of about 10 nm to 380 nm, the wavelength of visible light may be larger (e.g., substantially larger) than the diameters of liquid crystal capsules 556, so that visible light may pass through the liquid crystal structure 550 including liquid crystal capsules 556 without scattering of visible light.

In example embodiments, the red, the green and the blue pigment coating layer 560R, 560G and 560B may include red, green and blue pigments, respectively, together with binders and dispersing agents. For example, the red pigment coating layer 560R may include a red pigment or a red dye with a binder and a dispersing agent. The red pigment coating layer 560R may substantially enclose a surface of the liquid crystal capsules 556.

In example embodiments, the red pigment coating layer 560R may be directly coated to the surface of the liquid crystal capsules 556. In some example embodiments, the red pigment coating layer 560R may be formed by attaching amphiphilic copolymers of which a portion is substituted with red-colored functional group to the surface of the liquid crystal capsules 556. The amphiphilic copolymers may be copolymers including both a hydrophilic functional group and a hydrophobic functional group. For example, the amphiphilic copolymer of which a hydrophilic functional group is substituted with a red color functional group may be attached to a surface of the liquid crystal capsules 556. The amphiphilic copolymer may be reactive to the color functional group and the liquid crystal capsule 556. Example chemical formula of the amphiphilic copolymer is illustrated as follows:

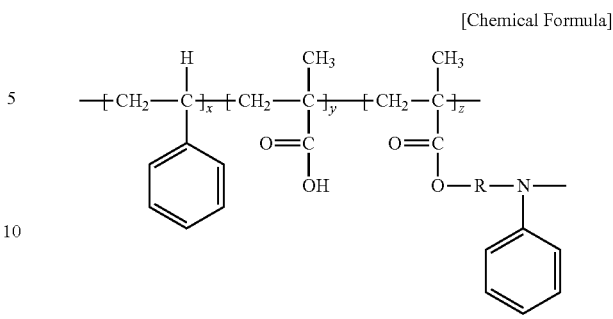

[Chemical Formula]

In example embodiments, each of the red, the green and the blue pigment coating layers 560R, 560G and 560B may include an additive such as a monomer, an initiator, a coupling agent or a leveling agent. The additive may initiate a polymerization reaction or may smooth an interface of the liquid crystal structure 550 in an exposure process and a developing process.

According to example embodiments, the liquid crystal display device may have the red, the green and the blue liquid crystal structures 550R, 550G and 550B including the liquid crystal capsules 556 coated with the red, the green and the blue pigment coating layers 560R, 560G and 560B, respectively, so that red, green and blue images may be displayed without a color filter.

Figure 14:
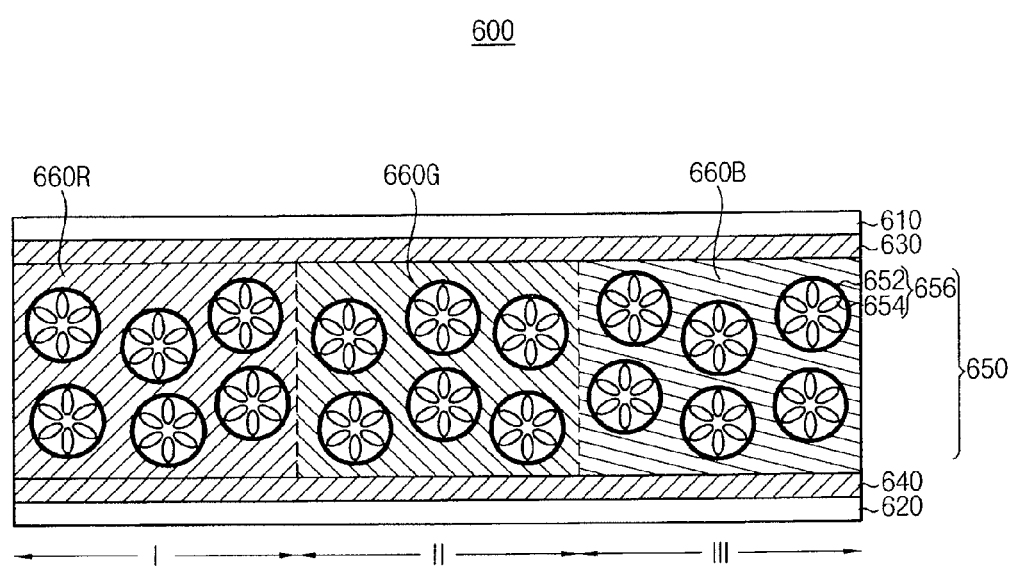

FIG. 14 is a cross-section view illustrating a liquid crystal display device in accordance with example embodiments. The liquid crystal display device illustrated in FIG. 14 may have a construction substantially the same as or substantially similar to those illustrate with reference to FIG. 1, except for a liquid crystal structure.

Referring to FIG. 14, the liquid crystal display device 600 may include a first substrate 610, a second substrate 620, a first electrode 630, a second electrode 640 and a liquid crystal structure 650. The liquid crystal display device 600 may have a first region I, a second region II and a third region III. The first region I may have a red pixel region, the second region II may include a green pixel region and the third region III may have a blue pixel region.

The first electrode 630 may be formed on the first substrate 610 and the second electrode 640 may be formed on the second substrate 620. The first electrode 630 and/or the second electrode 640 may have a shape substantially the same as or substantially similar to those described with reference to FIGS. 2A to 2F.

In example embodiments, the liquid crystal structure 650 may be positioned between the first electrode 630 on the first substrate 610 and the second electrode 640 on the second substrate 620. The liquid crystal structure 650 may include a plurality of liquid crystal capsules 656 and red, green and blue color binders 660R, 660G and 660B.

Each of the liquid crystal capsules 656 may include a polymer layer 652 and liquid crystal molecules 654 received in the polymer layer 652. For example, each of the liquid crystal capsules 556 may have a diameter of about 10 nm to about 380 nm. The red, the green and the blue color binders 660R, 660G and 660B may include binders having colors of red, green and blue, respectively, together with additives. For example, the red color binder 660R may include a binder having a red color, a dispersing agent, a monomer, an initiator, a coupling agent or a leveling agent.

In example embodiments, the red liquid crystal structure 650R including the red color binder 660R may have a plurality of the liquid crystal capsules 656 dispersed in the red color binder 660R. The green liquid crystal structure 650G including the green color binder 660G may have a plurality of the liquid crystal capsules 656 dispersed in the green color binder 660G. The blue liquid crystal structure 650B including the blue color binder 660B may have a plurality of the liquid crystal capsules 656 dispersed in the blue color binder 660B.

According to example embodiments, the liquid crystal display device may have the red, the green and the blue liquid crystal structures 650R, 650G and 650B including the red, the green and the blue color binders 660R, 660G and 660B, together with the liquid crystal capsules 656 and on the red, the green and the blue pixel regions of the liquid crystal display device 600, respectively, so that red, green and blue images may be displayed without a color filter.

According to example embodiments, the liquid crystal display device may have the liquid crystal structure including a plurality of liquid crystal capsules having a diameter smaller than the shortest wavelength of visible light. Visible light may be transmitted through the liquid crystals molecules so that an alignment layer may not be required to control the initial alignment of the liquid crystal molecules. Additionally, the movement of the liquid crystal molecules may be confined in the liquid crystal capsules so that a spacer or a supporting member may not be required to place the liquid crystal molecules uniformly at each pixel. Pooling or bruising effect caused by the displacement of the liquid crystal molecules may be reduced or avoided when a user touches the first and the second substrates. Further, the liquid crystal display device may have the red, the green and the blue liquid crystal structures including the red, the green and the blue pigments, pigment coating layers or color binders, so that the liquid crystal display device may display red, green and blue images without a color filter or a retardation film.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the invention. Accordingly, all such modifications are intended to be included within the scope of the invention as defined in the claims and their equivalents. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims and their equivalents.

What is claimed is:

1. A liquid crystal display device comprising:
   a first substrate;
   a first electrode on a first face of the first substrate, wherein the first electrode is a common electrode and the common electrode has a substantially embossed "I" shape or a substantially engraved "I" shape;
   a second substrate opposed to the first substrate;
   a second electrode on a first face of the second substrate, the second electrode corresponding to the first electrode; and
   a liquid crystal structure between the first substrate and the second substrate, the liquid crystal structure comprising liquid crystal capsules.

2. The liquid crystal display device of claim 1, wherein each of the liquid crystal capsules comprises liquid crystal molecules and a polymer layer enclosing the liquid crystal molecules.

3. The liquid crystal display device of claim 2, wherein the liquid crystal display device includes a first region, a second region and a third region, and wherein the liquid crystal structure includes a red liquid crystal structure in the first region, a green liquid crystal structure in the second region and a blue liquid crystal structure in the third region.

4. The liquid crystal display device of claim 3, wherein the red liquid crystal structure, the green liquid crystal structure and the blue liquid crystal structure include a red pigment structure, a green pigment structure and a blue pigment structure, respectively.

5. The liquid crystal display device of claim 4, wherein the red, the green and the blue pigment structures respectively include red, green and blue pigments mixed with binders, surface-active agents and additives.

6. The liquid crystal display device of claim 3, wherein the red, the green and the blue liquid crystal structures include red, green and blue pigment coating layers enclosing the liquid crystal capsules, respectively.

7. The liquid crystal display device of claim 6, wherein the red, the green and the blue pigment coating layers respectively include red, green and blue pigments mixed with binders, surface-active agents and additives.

8. The liquid crystal display device of claim 3, wherein the red, the green and the blue liquid crystal structures include red, green and blue color binders in which the liquid crystal capsules are dispersed, respectively.

9. The liquid crystal display device of claim 3, further comprising barrier ribs disposed among the red, the green and the blue liquid crystal structures.

10. The liquid crystal display device of claim 2, wherein each of the liquid crystal molecules has a positive dielectric anisotropy or a negative dielectric anisotropy.

11. The liquid crystal display device of claim 1, wherein each of the liquid crystal capsules has a diameter of about 10 nm to about 380 nm.

12. The liquid crystal display device of claim 1, further comprising at least one polarization plate on at least one of a second face of the first substrate and a second face of the second substrate.

13. The liquid crystal display device of claim 12, wherein at least one of the first electrode and the second electrode is aligned relative to an optical axis of the at least one polarization plate at an angle of about 45 degrees.

14. The liquid crystal display device of claim 13, wherein the second electrode has a substantially embossed "I" shape, a substantially engraved "I" shape, a substantially embossed "T" shape, a substantially engraved "T" shape, a separated embossed "T" shape or a separated engraved "T" shape.

15. The liquid crystal display device of claim 1, further comprising:
   a first polarization plate on a second face of the first substrate; and
   a second polarization plate on a second face of the second substrate.

16. The liquid crystal display device of claim 15, wherein at least one of the first electrode and the second electrode is aligned relative to at least one of an optical axis of the first polarization plate and an optical axis of the second polarization plate at an angle of about 45 degrees.

17. A liquid crystal display device comprising: a first substrate; a first electrode on a first face of the first substrate, wherein the first electrode is a common electrode and the common electrode has substantially embossed "I" shape or a substantially engraved "I" shape; a second substrate opposed to the first substrate; a reflection layer on a first face of the second substrate opposed to the first face of the first substrate, the reflection layer corresponding to the first electrode; and a liquid crystal structure between the first substrate and the second substrate, the liquid crystal structure comprising liquid crystal capsules.

18. The liquid crystal display device of claim 17, wherein the reflection layer comprises at least one material selected from the group consisting of aluminum (Al), chrome (Cr), molybdenum (Mo), platinum (Pt), and combinations thereof.

19. The liquid crystal display device of claim 17, wherein the reflection layer comprises a plurality of concave portions and a plurality of convex portions.

20. The liquid crystal display device of claim 17, further comprising a polarization plate on a second face of the first substrate.

21. The liquid crystal display device of claim 20, wherein the first electrode is aligned relative to an optical axis of the polarization plate at an angle of about 45 degrees.

22. The liquid crystal display device of claim 17, wherein the liquid crystal display device comprises a reflective region and a transmissive region, the reflection layer is in the reflective region, and the liquid crystal display device further comprises a second electrode on the first face of the second substrate in the transmissive region.

23. The liquid crystal display device of claim 17, wherein each of the liquid crystal capsules comprises liquid crystal molecules and a polymer layer enclosing the liquid crystal molecules.

24. The liquid crystal display device of claim 23, wherein the liquid crystal display device includes a first region, a second region and a third region, and wherein the liquid crystal structure includes a red liquid crystal structure in the first region, a green liquid crystal structure in the second region and a blue liquid crystal structure in the third region.

25. The liquid crystal display device of claim 24, wherein the red, the green and the blue liquid crystal structures include red, green and blue pigment structures, respectively.

26. The liquid crystal display device of claim 24, wherein the red, the green and the blue liquid crystal structures include red, green and blue pigment coating layers enclosing the liquid crystal capsules, respectively.

27. The liquid crystal display device of claim 24, wherein the red, the green and the blue liquid crystal structures include red, green and blue color binders in which the liquid crystal capsules are dispersed, respectively.

28. The liquid crystal display device of claim 24, further comprising barrier ribs among the red, the green and the blue liquid crystal structures.

29. A method of manufacturing a liquid crystal display device, the method comprising:
forming a first electrode on a first face of a first substrate, wherein the first electrode is a common electrode and the common electrode has a substantially embossed "I" shape or a substantially engraved "I" shape;
forming a polarization plate on a second face of the first substrate;
forming a second electrode on a first face of a second substrate opposed to the first face of the first substrate; and
forming a liquid crystal structure between the first substrate and the second substrate, the liquid crystal structure comprising liquid crystal capsules having liquid crystal molecules.

30. The method of claim 29, wherein forming the first electrode comprises:
forming a conductive layer on the first face of the first substrate; and
patterning the conductive layer to form the first electrode aligned relative to an optical axis of the polarization plate at an angle of about 45 degrees.

31. The method of claim 29, wherein the liquid crystal molecules are formed using a high pressure homogenizer.

32. The method of claim 29, wherein forming the liquid crystal structure comprises spreading the liquid crystal capsules on the first electrode or on the second electrode.

33. The method of claim 29, wherein forming the liquid crystal structure comprises printing the liquid crystal capsules on the first electrode or on the second electrode.

34. The method of claim 29, further comprising combining the first substrate with the second substrate before forming the liquid crystal structure or after forming the liquid crystal structure.

35. A method of manufacturing a liquid crystal display device, the method comprising:
forming a first electrode on a first substrate, the first substrate having a first region, a second region and a third region, wherein the first electrode is a common electrode and the common electrode has a substantially embossed "I" shape or a substantially engraved "I" shape;
forming a blue liquid crystal structure in the third region;
forming a green liquid crystal structure in the second region;
forming a red liquid crystal structure in the first region;
forming a second electrode on a second substrate; and
combining the first substrate with the second substrate by interposing the blue, the green and the red liquid crystal structures between the first and the second substrates.

36. The method of claim 35, further comprising forming barrier ribs among the first region, the second region and the third region.

37. The method of claim 35, wherein forming the blue liquid crystal structure comprises:
spreading a blue mixture including a blue pigment structure and liquid crystal capsules on the first electrode in the third region; and
forming the blue liquid crystal structure from the blue mixture,
wherein forming the green liquid crystal structure comprises:
spreading a green mixture including a green pigment structure and liquid crystal capsules on the first electrode in the second region; and
forming the green liquid crystal structure from the green mixture, and
wherein forming the red liquid crystal structure comprises:
spreading a red mixture including a red pigment structure and liquid crystal capsules on the first electrode in the first region; and
forming the red liquid crystal structure from the red mixture.

38. The method of claim 35, wherein forming the blue liquid crystal structure comprises:
forming a preliminary blue liquid crystal structure including a blue pigment structure and liquid crystal capsules on the first electrode; and
removing portions of the preliminary blue liquid crystal structure from the first and the second regions.

39. The method of claim 38, wherein forming the green liquid crystal structure comprises:

forming a preliminary green liquid crystal structure including a green pigment structure and liquid crystal capsules on the blue liquid crystal structure and the first electrode; and removing portions of the preliminary green liquid crystal structure from the first region and the blue liquid crystal structure.

40. The method of claim 39, wherein forming the red liquid crystal structure comprises:

forming a preliminary red liquid crystal structure including a red pigment structure and liquid crystal capsules on the blue and the green liquid crystal structures and the first electrode; and removing portions of the preliminary red liquid crystal structure from the blue and the green liquid crystal structures.

41. The method of claim 39, wherein removing the portions of the preliminary blue, the preliminary green and the preliminary red liquid crystal structures comprises an exposure process and a developing process.

* * * * *